United States Patent
Akita et al.

(10) Patent No.: US 11,939,250 B2
(45) Date of Patent: *Mar. 26, 2024

(54) ION REMOVING SYSTEM

(71) Applicant: Panasonic Intellectual Property Management Co., Ltd., Osaka (JP)

(72) Inventors: Tomohiro Akita, Osaka (JP); Yasunari Maeda, Osaka (JP); Ayane Kihara, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 206 days.

This patent is subject to a terminal disclaimer.

(21) Appl. No.: 16/970,370

(22) PCT Filed: Oct. 19, 2018

(86) PCT No.: PCT/JP2018/039026
§ 371 (c)(1),
(2) Date: Aug. 16, 2020

(87) PCT Pub. No.: WO2019/167335
PCT Pub. Date: Sep. 6, 2019

(65) Prior Publication Data
US 2020/0407254 A1 Dec. 31, 2020

(30) Foreign Application Priority Data

Feb. 28, 2018 (JP) .................................. 2018-034526
Feb. 28, 2018 (JP) .................................. 2018-034527
(Continued)

(51) Int. Cl.
*C02F 5/08* (2023.01)
*B04C 5/12* (2006.01)
(Continued)

(52) U.S. Cl.
CPC .................. *C02F 5/08* (2013.01); *B04C 5/12* (2013.01); *C02F 1/42* (2013.01); *C02F 2101/10* (2013.01);
(Continued)

(58) Field of Classification Search
CPC ...... C02F 1/38; C02F 1/66; C02F 1/02; C02F 2201/005; C02F 2201/002;
(Continued)

(56) References Cited

U.S. PATENT DOCUMENTS 4,747,962 A * 5/1988 Smisson ............ B01D 21/2488
210/512.1
4,780,201 A * 10/1988 Keeter ............... B01D 17/0214
210/512.1
(Continued)

FOREIGN PATENT DOCUMENTS

CN 105451888 A * 3/2016 ............. B01D 61/04
EP 3056473 A1 8/2016
(Continued)

OTHER PUBLICATIONS

WIPO English machine translation of JP2001113285A, Takaaki, Published Apr. 24, 2001, 9 page. (year: 2001) (Year: 2001).*
(Continued)

*Primary Examiner* — Magali P Slawski
*Assistant Examiner* — Robin S Gray
(74) *Attorney, Agent, or Firm* — Renner, Otto, Boisselle & Sklar, LLP

(57) ABSTRACT

An ion removing system having an ion removing apparatus that includes a fine bubble generating part generating fine bubbles and that causes the fine bubbles to adsorb metal ions to remove the metal ions from the hard water due to supply the fine bubbles generated by the fine bubble generating part into the hard water. In addition, the ion removing system
(Continued)

includes a primary-side flow path to supply the hard water to the ion removing apparatus, a separating apparatus that separates crystals of a metal component deposited by crystallizing the metal ions removed from the hard water by the ion removing apparatus, and a secondary-side flow path that takes out, from the separating apparatus, treated water obtained by separating the crystals. The primary-side flow path is provided with a supply-side backflow prevention mechanism.

13 Claims, 13 Drawing Sheets

(30) Foreign Application Priority Data

Feb. 28, 2018 (JP) ................................ 2018-034533
Feb. 28, 2018 (JP) ................................ 2018-034538

(51) Int. Cl.
*C02F 1/42* (2023.01)
*C02F 101/10* (2006.01)

(52) U.S. Cl.
CPC .... *C02F 2201/002* (2013.01); *C02F 2303/22* (2013.01)

(58) Field of Classification Search
CPC .......... C02F 2209/055; C02F 2301/043; C02F 2301/046; C02F 2303/22; C02F 1/58–1/64; C02F 1/42; C02F 5/00–5/14; C02F 5/08; C02F 2101/10; C02F 5/083; C02F 5/086; C02F 5/10; C02F 5/105; C02F 5/12; C02F 5/125; C02F 5/145; C02F 11/127; C02F 2209/235; C02F 2209/245; C02F 2209/265; C02F 2209/285; C02F 2301/026; C02F 2301/04; C02F 2303/16; C02F 2303/14; C02F 2303/18; C02F 2001/422; C02F 2001/425; C02F 2001/427; C02F 1/62; C02F 2108/16; C02F 2108/20; C02F 2108/203; C02F 2108/206; B01D 9/00–9/04; B01D 21/00–21/01; B01D 21/02–21/34; B04C 5/12; B04C 5/103; B04C 5/107; B04C 5/13; B04C 5/08; B04C 5/00; B04C 1/00–11/00; C10L 3/08; C10L 3/00; C07B 61/00; C07B 63/02; C07C 5/00; B03D 1/33–3/06
See application file for complete search history.

(56) References Cited

U.S. PATENT DOCUMENTS

| | | | | |
|---|---|---|---|---|
| 5,660,723 | A * | 8/1997 | Sanderson | C02F 1/481 210/138 |
| 6,719,894 | B2 * | 4/2004 | Gavrel | C02F 1/463 205/744 |
| 6,780,310 | B1 * | 8/2004 | Howe | B01D 17/0217 210/170.03 |
| 7,687,663 | B2 * | 3/2010 | Scaia | B01J 41/07 502/10 |
| 2004/0213713 | A1 | 10/2004 | Shimamura | |
| 2006/0272989 | A1 * | 12/2006 | Bagley | C01B 13/10 210/198.1 |
| 2009/0169452 | A1 * | 7/2009 | Constantz | C02F 1/683 423/220 |
| 2013/0146543 | A1 * | 6/2013 | Khamizov | B01J 39/05 210/295 |

FOREIGN PATENT DOCUMENTS

| | | | | |
|---|---|---|---|---|
| EP | 3056473 | A1 * | 8/2016 | ............... F28F 19/01 |
| JP | P2000-15260 | A * | 1/2000 | ........ C02F 2201/461 |
| JP | 2000-140840 | A | 5/2000 | |
| JP | 2001-113285 | A | 4/2001 | |
| JP | 2001113285 | A * | 4/2001 | ............... C02F 1/58 |
| JP | 2003-190707 | A | 7/2003 | |
| JP | 2006-225555 | A | 8/2006 | |
| JP | 2007-117874 | A | 5/2007 | |
| JP | 2008-006405 | A | 1/2008 | |
| JP | 2009-131737 | A | 6/2009 | |
| JP | 2010-078239 | A | 4/2010 | |
| JP | 2014076421 | A * | 1/2014 | ............... B01F 3/04 |
| JP | 2014-076421 | A | 5/2014 | |
| JP | 2016-117051 | A | 6/2016 | |
| JP | 2016117051 | A * | 6/2016 | ............. B01D 21/26 |
| KR | 2009-0104791 | A | 10/2009 | |
| WO | 2006/090791 | A1 | 8/2006 | |
| WO | WO-2011019854 | A2 * | 2/2011 | ............. C02F 3/006 |
| WO | WO-2013036804 | A1 * | 3/2013 | ............... C02F 1/04 |

OTHER PUBLICATIONS

WIPO English machine translation of JP2014076421A, Junichiro, published May 1, 2014, 12 pages. (Year: 2014) (Year: 2014).*
Espacenet English machine translation of JP2016117051A, Teiji, published Jun. 30, 2016, 14 pages. (Year: 2016) (Year: 2016).*
English machine translation of JP 201161407 A; Aug. 25, 2011; Toshihiko Sakata; 30 pages. (Year: 2011).*
English machine translation of CN 105451888 A; Mar. 30, 2016; Govind; 97 pages. (Year: 2016).*
International Preliminary Report on Patentability for corresponding Application No. PCT/JP2018/039026, dated Sep. 10, 2020 with an English translation, 17 Pages.
DAF—dissolved air flotation: Potential applications in the mining and mineral processing industry; R. T. Rodrigues et al., Int. J. Miner. Process. 82 (2007) 1-13.
Indian First Examination Report for corresponding patent application No. 202017035592, dated Jan. 13, 2021, 5 Pages.
Matsumoto et al., "The Application of Micro- Bubbles for Dissolution and Crystallization of Calcium, Carbonate in Gas-Liquid-Solid System", Bulletin of the Society of Sea Water Science, Japan, vol. 58, Jan. 1, 2004, pp. 475-486, XP055537923, Weinheim, 12 Pages.
Extended European Search Report for corresponding patent application No. 18908038.5, dated Mar. 19, 2021, 7 Pages.
International Search Report for corresponding Application No. PCT/JP2018/039026, dated Jan. 15, 2019, 4 pages.

* cited by examiner

ION REMOVING SYSTEM

TECHNICAL FIELD

The present disclosure relates to an ion removing system.

BACKGROUND ART

An ion removing system removing metal ions in hard water has hitherto been disclosed (see, e.g., Patent Document 1).

The ion removing system of Patent Document 1 removes metal ions (calcium ions and magnesium ions) in hard water with an ion exchange resin. Specifically, by allowing hard water to flow into a treatment tank including an ion exchange resin having sodium ions attached to a surface, the metal ions in the hard water are replaced with the sodium ions to remove the metal ions from the hard water. As a result, the hardness of the hard water is reduced to generate soft water. The metal ions present in the hard water are captured on the surface of the ion exchange resin.

PRIOR ART DOCUMENT

Patent Document

Patent Document 1: JP 2000-140840 A

SUMMARY OF THE INVENTION

Subjects to be Solved by the Invention

However, the ion removing system of Patent Document 1 requires a large amount of salt water for regenerating the ion exchange resin having captured the metal ions and has a problem of troublesome maintenance. Moreover, a regeneration treatment generates wastewater containing a large amount of salt water, causing problems of soil pollution and an increased load on sewage treatment. Furthermore, treated water softened by an ion removing apparatus has a high concentration of sodium ions and may not be recommended as drinking water in some regions.

As described above, the ion removing system using an ion exchange resin has room for improvement from the viewpoints of maintainability and environmental properties.

Therefore, an object of the present disclosure is to solve the problems and to provide an ion removing system having excellent maintainability and environmental properties.

Means for Solving the Subjects

To achieve the object, an ion removing system according to an aspect of the present disclosure comprises:
an ion removing apparatus that includes a hard water storage part storing hard water and a fine bubble generating part generating and supplying fine bubbles to the hard water storage part and that causes the fine bubbles to adsorb metal ions in the hard water in the hard water storage part to remove the metal ions from the hard water;
a primary-side flow path connected to the ion removing apparatus to supply the hard water to the ion removing apparatus;
a separating apparatus connected to the ion removing apparatus and separating crystals of a metal component deposited by crystallizing the metal ions removed from the hard water by the ion removing apparatus; and
a secondary-side flow path connected to the separating apparatus to take out, from the separating apparatus, treated water obtained by separating the crystals, wherein the primary-side flow path is provided with a supply-side backflow prevention mechanism.

An ion removing system according to an aspect of the present disclosure comprises:
an ion removing apparatus that includes a hard water storage part storing hard water and a fine bubble generating part generating and supplying fine bubbles to the hard water storage part and that causes the fine bubbles to adsorb metal ions in the hard water in the hard water storage part to remove the metal ions from the hard water;
a primary-side flow path connected to the ion removing apparatus to supply the hard water to the ion removing apparatus;
a separating apparatus connected to the ion removing apparatus and separating crystals of a metal component deposited by crystallizing the metal ions removed from the hard water by the ion removing apparatus;
a secondary-side flow path connected to the separating apparatus to take out, from the separating apparatus, treated water obtained by separating the crystals;
a bypass flow path connecting the primary-side flow path and the secondary-side flow path; and
a flow switching mechanism switching a flow direction of the hard water flowing through the primary-side flow path to either the ion removing apparatus or the bypass flow path.

An ion removing system according to an aspect of the present disclosure comprises:
an ion removing apparatus that includes a hard water storage part storing hard water and a fine bubble generating part generating and supplying fine bubbles to the hard water storage part and that causes the fine bubbles to adsorb metal ions in the hard water in the hard water storage part to remove the metal ions from the hard water;
a primary-side flow path connected to the ion removing apparatus to supply the hard water to the ion removing apparatus;
a separating apparatus connected to the ion removing apparatus and separating crystals of a metal component deposited by crystallizing the metal ions removed from the hard water by the ion removing apparatus;
a secondary-side flow path connected to the separating apparatus to take out, from the separating apparatus, treated water obtained by separating the crystals; and
a return flow path connected to the separating apparatus and the primary-side flow path to return a portion of the treated water to the primary-side flow path.

An ion removing system according to an aspect of the present disclosure comprises:
an ion removing apparatus that includes a hard water storage part storing hard water and a fine bubble generating part generating and supplying fine bubbles to the hard water storage part and that causes the fine bubbles to adsorb metal ions in the hard water in the hard water storage part to remove the metal ions from the hard water;
a primary-side flow path connected to the ion removing apparatus to supply the hard water to the ion removing apparatus;
a separating apparatus connected to the ion removing apparatus and separating crystals of a metal component deposited by crystallizing the metal ions removed from the hard water by the ion removing apparatus;

a secondary-side flow path connected to the separating apparatus to take out, from the separating apparatus, treated water obtained by separating the crystals; and a solubilizer supply part supplying a solubilizer dissolving crystals to the upstream side in the flow direction of the hard water relative to the separating apparatus.

Effect of the Invention

The present disclosure can provide the ion removing system having excellent maintainability and environmental properties.

MODES FOR CARRYING OUT THE INVENTION

Figure 1:
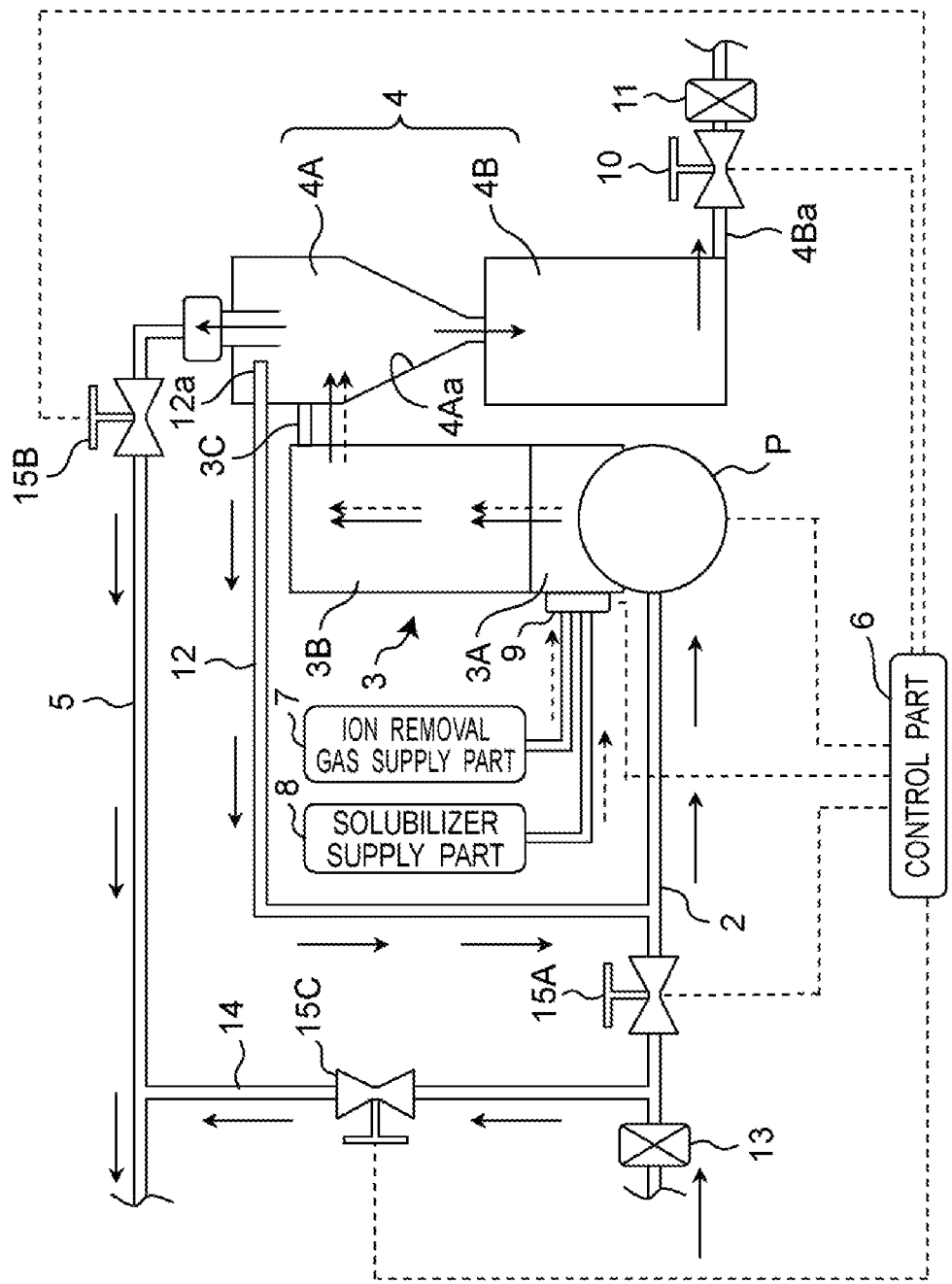
FIG. 1 is a schematic diagram of an ion removing system according to a first embodiment.

As a result of intensive studies, the present inventors found novel knowledge that removal of metal ions can be promoted by using "fine bubbles" not conventionally used in an ion removal technique (softening technique) for removing metal ions from hard water, thereby completing the following invention.

An ion removing system according to an aspect of the present disclosure includes an ion removing apparatus that includes a hard water storage part storing hard water and a fine bubble generating part generating and supplying fine bubbles to the hard water storage part and that causes the fine bubbles to adsorb metal ions in the hard water in the hard water storage part to remove the metal ions from the hard water, a primary-side flow path connected to the ion removing apparatus to supply the hard water to the ion removing apparatus, a separating apparatus connected to the ion removing apparatus and separating crystals of a metal component deposited by crystallizing the metal ions removed from the hard water by the ion removing apparatus, and a secondary-side flow path connected to the separating apparatus to take out, from the separating apparatus, treated water obtained by separating the crystals, wherein the primary-side flow path is provided with a supply-side backflow prevention mechanism.

According to this configuration, the metal ions are removed from the hard water by using the fine bubbles, and this can eliminate the need for a large amount of salt water required for regenerating an ion exchange resin. As a result, a regeneration treatment can be simplified to make maintenance easier. Additionally, since regeneration wastewater containing salt water is not generated, soil pollution and a load on sewage treatment can be suppressed to improve environmental properties. Furthermore, concentration of sodium ions is not increased in the treated water, so that the generated treated water can be used as drinking water.

According to the configuration, the supply-side backflow prevention mechanism can prevent the fine bubbles and the treated water from flowing back to the hard water supply side.

If a flow rate of liquid flowing from the primary-side flow path to the secondary-side flow path is drastically reduced due to use of the treated water flowing through the secondary-side flow path, the metal ion removal efficiency may be reduced. Therefore, the ion removing system according to an aspect of the present disclosure may include a return flow path connected to the separating apparatus and the primary-side flow path to return a portion of the treated water to the primary-side flow path, and the supply-side backflow prevention mechanism may be disposed on the primary-side flow path upstream of the return flow path in the flow direction of the hard water. According to this configuration, since the return flow path is included, a circulation flow path can be constituted by the primary-side flow path, the ion removing apparatus, the separating apparatus, and the return flow path. This circulation flow path can further stabilize fluctuations in the flow rate of the liquid flowing from the primary-side flow path to the secondary-side flow path to suppress a reduction in the metal ion removal efficiency. According to the configuration, the supply-side backflow prevention mechanism can more reliably prevent the fine bubbles, the treated water, etc. from flowing back to the hard water supply side, For example, when maintenance is required due to a failure of the ion removing apparatus etc., water cannot be used during the maintenance. Therefore, an ion removing system according to an aspect of the present disclosure may include a bypass flow path connecting the primary-side flow path and the secondary-side flow path, and a flow switching mechanism switching a flow direction of the hard water flowing through the primary-side flow path to either the ion removing apparatus or the bypass flow path, and the supply-side backflow prevention mechanism may be disposed on the primary-side flow path upstream of the bypass flow path in the flow direction of the hard water. According to this configuration, since the flow switching mechanism can be switched to cause the hard water flowing through the primary-side flow path to flow through the bypass flow path to the secondary-side flow path, the hard water can be used even during maintenance. According to the configuration, even not during maintenance, the flow switching mechanism can be switched to selectively use the hard water and the treated water. According to the configuration, the supply-side backflow prevention mechanism can more reliably prevent the fine bubbles, the treated water, etc. from flowing back to the hard water supply side.

The separating apparatus may include a discharge flow path for discharging crystals, and the discharge flow path may be provided with a discharge-side backflow prevention mechanism. According to this configuration, the crystals of the metal component can be prevented from flowing back into the separating apparatus to restrain the crystals of the metal component from mixing again into the treated water obtained by separating the crystal of the metal component.

The ion removing system may include the bypass flow path connecting the primary-side flow path and the secondary-side flow path, and the flow switching mechanism switching a flow direction of the hard water flowing through the primary-side flow path to either the ion removing apparatus or the bypass flow path. According to this configuration, since the flow switching mechanism can be switched to cause the hard water flowing through the primary-side flow path to flow through the bypass flow path to the secondary-side flow path, the hard water can be used even during maintenance. According to the configuration, even not during maintenance, the flow switching mechanism can be switched to selectively use the hard water and the treated water.

The flow switching mechanism may be configured to include a first valve capable of opening and closing the primary-side flow path, a second valve capable of opening and closing the secondary-side flow path, and a third valve capable of opening and closing the bypass flow path. According to this configuration, the flow direction of the hard water flowing through the primary-side flow path can be switched with a simpler configuration.

The ion removing system may include a controller controlling the opening/closing operations of the first valve, the second valve, and the third valve, and the controller may be configured to selectively provide a first control of opening the first valve and the second valve and closing the third valve, and a second control of closing the first valve and the second valve and opening the third valve. According to this configuration, the flow direction of the hard water flowing through the primary-side flow path can automatically be switched by the controller.

The ion removing system may include a return flow path connected to the separating apparatus and the primary-side flow path to return a portion of the treated water to the primary-side flow path. According to this configuration, since the return flow path is included, a circulation flow path can be constituted by the primary-side flow path, the ion removing apparatus, the separating apparatus, and the return flow path. This circulation flow path can further stabilize fluctuations in the flow rate of the liquid flowing from the primary-side flow path to the secondary-side flow path to suppress a reduction in the metal ion removal efficiency.

The ion removing system may include a pump causing the hard water flowing through the primary-side flow path to flow through the ion removing apparatus to the separating apparatus. According to this configuration, by driving the pump to forcibly circulate the liquid in the circulation flow path, the fluctuations in the flow rate of the liquid can further be stabilized to suppress a reduction in the metal ion removal efficiency. The crystals of the metal component can be prevented from mixing into the treated water.

The primary-side flow path, the ion removing apparatus, the separating apparatus, and the return flow path may constitute the circulation flow path that is a closed system. According to this configuration, air can be prevented from being entrapped into the circulation flow path to further stabilize the fluctuations in the flow rate of the liquid.

The separating apparatus may be a cyclone-type centrifugal separating apparatus having a tapered inner circumferential surface with a diameter decreasing downward and causing the hard water to spirally flow downward along the inner circumferential surface so that the crystals of the metal component are separated. According to this configuration, since the metal ions having a large specific gravity removed from the hard water move toward the inner circumferential surface due to centrifugal separation, the crystals of the metal component can be concentrated in the vicinity of the inner circumferential surface. Therefore, for example, by disposing an inlet of the secondary-side flow path at a position distant from the inner circumferential surface, the crystals of the metal component can be prevented from entering the secondary-side flow path.

One end portion of the return flow path may be opened on the central axis side of the separating apparatus. This configuration can prevent the crystals of the metal component deposited in the vicinity of the inner circumferential surface from entering the return flow path.

The ion removing apparatus may include a connection flow path connected to the separating apparatus below the one end portion of the return flow path. According to this configuration, the crystals of the metal component deposited in the vicinity of the inner circumferential surface can further be prevented from entering the return flow path.

The ion removing system may include a solubilizer supply part supplying a solubilizer dissolving crystals to the upstream side in the flow direction of the hard water relative to the separating apparatus. According to this configuration, the solubilizer can be supplied from the upstream side in the flow direction of the hard water relative to the separating apparatus to dissolve the crystals adhering to the separating apparatus for performing the regeneration treatment.

The solubilizer supply part is configured to supply a dissolution gas for dissolving crystals as a solubilizer to the fine bubble generating part, and the fine bubble generating part may be provided with a gas switching mechanism switched to supply either an ion removal gas for removing metal ions in hard water or the dissolution gas. According to this configuration, by switching the gas switching mechanism, a softening treatment with the ion removal gas and a regeneration treatment with the dissolution gas can selectively be performed.

The ion removing system may include a pump causing the hard water flowing through the primary-side flow path to flow through the ion removing apparatus to the separating apparatus, and the fine bubble generating part may be disposed downstream of the pump in the flow direction of the hard water. According to this configuration, a gas can be prevented from entering the pump.

The ion removing system may include a return flow path connected to the separating apparatus to return a portion of the treated water to the primary-side flow path; a circulation flow path may be constituted by the primary-side flow path, the ion removing apparatus, the separating apparatus, and the return flow path; and the solubilizer supply part may be disposed to supply the solubilizer into the circulation flow path. According to this configuration, the circulation flow path can further stabilize fluctuations in the flow rate of the liquid flowing from the primary-side flow path to the secondary-side flow path to suppress a reduction in the metal ion removal efficiency. Additionally, by disposing the solubilizer supply part to supply the solubilizer into the circulation flow path, the solubilizer can be supplied to the separating apparatus to dissolve the crystals adhering to the separating apparatus for performing the regeneration treatment.

First to third embodiments of the present disclosure will hereinafter be described in detail with reference to the drawings.

FIRST EMBODIMENT

FIG. 1 is a diagram showing a schematic configuration of an ion removing system 1 according to a first embodiment.
<General Configuration>
The ion removing system 1 according to the first embodiment includes a primary-side flow path 2, an ion removing apparatus 3, a separating apparatus 4, and a secondary-side flow path 5.

The primary-side flow path 2 is connected to the ion removing apparatus 3. The primary-side flow path 2 is a flow path for supplying hard water to the ion removing apparatus 3. In the first embodiment, a pump P is disposed in a connecting portion between the primary-side flow path 2 and the ion removing apparatus 3. The pump P functions to cause the hard water flowing through the primary-side flow path 2 to flow through the ion removing apparatus 3 to the separating apparatus 4. The drive of the pump P is controlled by a controller 6.

The ion removing apparatus 3 includes a hard water storage part 3A storing hard water, and a fine bubble generating part 3B generating and supplying fine bubbles to the hard water storage part 3A. The ion removing apparatus 3 is an apparatus causing fine bubbles to adsorb metal ions in hard water in the hard water storage part 3A and thereby removing the metal ions from the hard water. The fine bubble generating part 3B is disposed downstream of the pump P in the flow direction of the hard water so that no gas does enters the pump P.

In the first embodiment, the metal ions are calcium ions ($Ca^{2+}$) or magnesium ions ($Mg^{2+}$). In the first embodiment, the fine bubbles are bubbles having a diameter of 100 μm or less. The micro bubbles include microbubbles (e.g., having a diameter of 1 μm to 100 μm) and nanobubbles (e.g., having a diameter of less than 1 μm). The microbubbles may be bubbles recognizable as those having a bubble diameter on the order of micrometers by those skilled in the field of water treatment. The nanobubbles may be bubbles recognizable as those having a bubble diameter on the order of nanometers by those skilled in the field of water treatment. The fine bubbles have properties different from ordinary bubbles, such as long retention time in water, each of bubbles hardly increasing in diameter and less likely to combine with other bubbles, and a large contact area facilitating a chemical reaction.

The fine bubbles may include bubbles having a diameter of 100 μm or more (such as milli-bubbles) in a small proportion. For example, bubbles having a diameter of 100 μm or less in a proportion of 90% or more may be defined as the fine bubbles. Additionally, conditions such as having a diameter of 60 μm or less in a proportion of 50% or more and having a diameter of 20 μm or less in a proportion of 5% or more may be added. When the diameter of bubbles (bubble diameter) is measured, for example, hard water containing fine bubbles may directly be photographed by a high-speed camera, and the bubble diameter may be calculated by a three-point method through image processing or may be measured by any other method. The timing of measuring the bubble diameter may be any timing as long as the fine bubbles are retained at the time. Examples of conditions of the measuring method using a high-speed camera described above are as follows.

High-speed camera: FASTCAM 1024 PCI (Photron)

Lens system: Z16 APO (Leica)

Objective lens: Planapo 2.0× (Leica)

Shooting speed: 1000 fps

Shutter speed: 1/505000 sec

Image area: 1024×1024 pixels (microbubble shooting area: 1.42 mm×1.42 mm, milli-bubble shooting area: 5.69 mm×5.69 mm)

Image processing software: Image-Pro Plus (Media Cybermatics)

In the first embodiment, an ion removal gas supply part 7 and a solubilizer supply part 8 are connected via a gas switching mechanism 9 to the fine bubble generating part 3B.

The ion removal gas supply part 7 is configured to supply an ion removal gas for removing metal ions in hard water to the fine bubble generating part 3B. In the first embodiment, the ion removal gas supply part 7 is configured to supply "air" as the ion removal gas to the fine bubble generating part 3B. The ion removal gas supply part 7 may include a tank filled with the ion removal gas, for example. Alternatively, the ion removal gas supply part 7 may be an apparatus generating the ion removal gas. Furthermore, the ion removal gas supply part 7 may be an apparatus connected to an ion removal gas supply source.

The solubilizer supply part 8 is configured to supply a dissolution gas, which is an example of a solubilizer dissolving crystals of a metal component deposited by crystallizing the metal ions removed from the hard water, to the fine bubble generating part 3B. In the first embodiment, the solubilizer supply part 8 is configured to supply "carbon dioxide ($CO_2$)" as the dissolution gas to the fine bubble generating part 3B. The solubilizer supply part 8 is disposed upstream of the separating apparatus 4 in the flow direction of the hard water so that the solubilizer can be supplied to the separating apparatus 4. The solubilizer supply part 8 may include a tank filled with the solubilizer, for example. Alternatively, the solubilizer supply part 8 may be an apparatus generating the solubilizer. Furthermore, the solubilizer supply part 8 may be an apparatus connected to a solubilizer supply source.

The gas switching mechanism 9 is a mechanism switched to supply either the ion removal gas or the dissolution gas to the fine bubble generating part 3B. By switching the gas switching mechanism 9, a softening treatment with the ion removal gas and a regeneration treatment with the dissolution gas can selectively be performed. The gas switching mechanism 9 is made up of one or more valves, for example. The switching operation of the gas switching mechanism 9 is controlled by the controller 6.

When the gas switching mechanism 9 is switched to supply the ion removal gas, the fine bubble generating part 3B generates the fine bubbles containing the ion removal gas. The fine bubbles remove the metal ions from the hard water and separate the crystals of the metal component, and the hard water is thereby subjected to the softening treatment. The principle of the softening treatment will be described in detail later.

On the other hand, when the gas switching mechanism 9 is switched to supply the dissolution gas, the fine bubble generating part 3B generates the fine bubbles containing the dissolution gas. The fine bubbles can dissolve the crystals of the metal component adhering to the separating apparatus 4 to perform the regeneration treatment as described later. The principle of the regeneration treatment will be described in detail later.

The separating apparatus 4 is connected to the ion removing apparatus 3 via a connection flow path 3C disposed on an upper outer circumferential portion of the hard water storage part 3A. The separating apparatus 4 is an apparatus separating the crystals of the metal component deposited by crystallizing the metal ions removed from the hard water by the ion removing apparatus 3. The ion removing apparatus 3 and the separating apparatus 4 can reduce the concentration (hardness) of the metal ions in the hard water to a predetermined concentration or less to produce soft water. For the definition of hard water and soft water, for example, the definition of WHO may be used. Specifically, the soft water may be defined as water having a hardness of less than 120 mg/L, and the hard water may be defined as water having a hardness of 120 mg/L or more.

In the first embodiment, the separating apparatus 4 is a cyclone-type centrifugal separating apparatus having a tapered inner circumferential surface 4Aa with a diameter decreasing downward and causing hard water to spirally flow downward along the inner circumferential surface 4Aa so that the crystals of the metal component are separated. In the first embodiment, the separating apparatus 4 includes a separating part 4A having the inner circumferential surface 4Aa and a crystal storage part 4B storing crystals of a metal component.

The connection flow path 3C is connected to the separating part 4A such that water having passed through the ion removing apparatus 3 is discharged in a direction eccentric from a central axis of the separating part 4A. Such an eccentric arrangement allows the water discharged into the separating part 4A to flow spirally downward along the inner circumferential surface 4Aa. The metal ions having a large specific gravity removed from the hard water move toward the inner circumferential surface 4Aa due to centrifugal separation and are deposited as the crystals of the metal component in the vicinity of the inner circumferential surface 4Aa. A portion of the crystals adheres to the inner circumferential surface 4Aa.

The crystal storage part 4B is disposed below the separating part 4A. The crystal storage part 4B includes a discharge flow path 4Ba for discharging water containing the crystals of the metal component. The discharge flow path 4Ba is provided with an opening/closing valve 10 capable of opening and closing the discharge flow path 4Ba. The opening/closing operation of the opening/closing valve 10 is controlled by the controller 6. A discharge-side backflow prevention mechanism 11 is disposed on the discharge flow path 4Ba downstream of the opening/closing valve 10 in a discharge direction.

The discharge-side backflow prevention mechanism 11 is a mechanism preventing the crystals of the metal component from flowing back into the separating apparatus 4. The discharge-side backflow prevention mechanism 11 can prevent the crystals of the metal component from mixing again into treated water (soft water) obtained by separating the crystal of the metal component from hard water. The discharge-side backflow prevention mechanism 11 is made up of one or more check valves, for example. Alternatively, the discharge-side backflow prevention mechanism 11 may be made up of a vacuum breaker, for example. Furthermore, the discharge side backflow prevention mechanism 11 may be configured to prevent backflow by a spout space disposed at an outlet of the discharge flow path 4Ba.

The secondary-side flow path 5 is connected to the separating apparatus 4. The secondary-side flow path 5 is a flow path for taking out from the separating apparatus 4 the treated water obtained by separating the crystals of the metal component. In the first embodiment, since the separating apparatus 4 is a cyclone-type centrifugal separating apparatus, the crystals of the metal component can be concentrated in the vicinity of the inner circumferential surface 4Aa. To prevent the crystals of the metal component from entering the secondary-side flow path 5, the secondary-side flow path 5 is connected to an upper central portion of the separating part 4A at a position distant from the inner circumferential surface 4Aa.

The treated water flowing through the secondary-side flow path 5 is supplied to a kitchen, a bathroom, a toilet, or a lavatory, for example. If a flow rate of liquid flowing from the primary-side flow path 2 to the secondary-side flow path 5 is drastically reduced due to use of the treated water, a speed of centrifuging the metal ions from the hard water may decrease, and the metal ion removal efficiency may be reduced. Additionally, the crystals of the metal component may be mixed in the treated water.

Therefore, in the first embodiment, a return flow path 12 is connected to the separating apparatus 4 and the primary-side flow path 2 so as to return to the primary-side flow path 2 a portion of the treated water obtained by separating the crystals of the metal component from the hard water by the separating apparatus 4. Specifically, the primary-side flow path 2, the ion removing apparatus 3, the separating apparatus 4, and the return flow path 12 constitute a circulation flow path. This circulation flow path can further stabilize fluctuations in the flow rate of the liquid flowing from the primary-side flow path 2 to the secondary-side flow path 5 to suppress a reduction in the metal ion removal efficiency. By driving the pump P to forcibly circulate the liquid in the circulation flow path, the fluctuations in the flow rate of the liquid can further be stabilized to suppress a reduction in the metal ion removal efficiency. The crystals of the metal component can be prevented from mixing into the treated water.

The flow rate of the liquid flowing through the circulation flow path is preferably equal to or greater than the flow rate of the soft water used (e.g., 2 liters/minute). When the flow rate of the liquid flowing through the circulation flow path is larger than the flow rate of the soft water used, the fluctuations in the flow rate of the liquid can be made more stable, and the soft water can more stably produced. The circulation flow path is preferably a closed system. As a result, air can be prevented from being entrapped into the circulation flow path to further stabilize the fluctuations in the flow rate of the liquid.

In the first embodiment, one end portion 12a of the return flow path 12 is opened on the central axis side of the separating part 4A. This prevents the crystals of the metal component deposited in the vicinity of the inner circumferential surface 4Aa from entering the return flow path 12. The connection flow path 3C of the ion removing apparatus 3 is connected to the separating part 4A below the one end portion 12a of the return flow path 12. Therefore, the one end part 12a of the return flow path 12 is located above an outlet of the connection flow path 3C from which the hard water after removal of the metal ions is spirally discharged downward. As a result, the crystals of the metal component deposited in the vicinity of the inner circumferential surface 4Aa are further prevented from entering the return flow path 12.

The primary-side flow path 2 is provided with a supply-side backflow prevention mechanism 13. The supply-side backflow prevention mechanism 13 is a mechanism preventing the fine bubbles and the treated water from flowing back to the hard water supply side. The supply-side backflow prevention mechanism 13 is made up of one or more check valves, for example. In the first embodiment, the supply-side backflow prevention mechanism 13 is disposed on the primary-side flow path 2 upstream of the return flow path 12 in the flow direction of the hard water. As a result, the fine bubbles, the treated water, etc. can more reliably be prevented from flowing back to the hard water supply side.

For example, when maintenance is required due to a failure of the ion removing apparatus 3 etc., water cannot be used during the maintenance. Therefore, in the first embodiment, the primary-side flow path 2 and the secondary-side flow path 5 are connected by a bypass flow path 14. The ion removing system 1 includes a flow switching mechanism switching the flow direction of the hard water flowing through the primary-side flow path 2 to either the ion removing apparatus 3 or the bypass flow path 14. Since the flow switching mechanism can be switched to cause the hard water flowing through the primary-side flow path 2 to flow through the bypass flow path 14 to the secondary-side flow path 5, the hard water can be used even during maintenance. Even not during maintenance, the flow switching mechanism can be switched to selectively use the hard water and the treated water (soft water).

In the first embodiment, the flow switching mechanism includes a first valve 15A capable of opening and closing the primary-side flow path 2, a second valve 15B capable of opening and closing the secondary-side flow path 5, and a third valve 15C capable of opening and closing the bypass flow path 14. The opening/closing operations of the first valve 15A, the second valve 15B, and the third valve 15C are controlled by the controller 6.

The controller 6 is configured to selectively provide a first control of opening the first valve 15A and the second valve 15B and closing the third valve 15C, and a second control of closing the first valve 15A and the second valve 15B and opening the third valve 15C. When the controller 6 provides the first control, the hard water flowing through the primary-side flow path 2 flows to the ion removing apparatus 3 and is subjected to the softening treatment before flowing into the secondary-side flow path 5. As a result, the treated water (soft water) is discharged to an outlet of the secondary-side flow path 5. When the controller 6 provides the second control, the hard water flowing through the primary-side flow path 2 flows through the bypass flow path 14 into the secondary-side flow path 5. As a result, the hard water is discharged to the outlet of the secondary-side flow path 5. Therefore, the controller 6 can provide the first control or the second control to selectively discharge the hard water or the treated water (soft water) from the outlet of the secondary-side flow path 5.

<Softening Treatment>

The principle of the softening treatment using fine bubbles will be described in more detail.

It is presumed that supplying fine bubbles containing air into hard water causes actions described in the following sections (1) and (2) on metal ions in the hard water. Specifically, it is presumed that the metal ions in the hard water can be adsorbed by the fine bubbles and that the adsorbed metal ions can be crystallized to remove crystals of a metal component from the hard water. More specifically, the principle will be described as follows. It is noted that the present disclosure is not bound to the specific principles described in the following sections (1) and (2).

(1) Adsorption of Metal Ions

Figure 2:
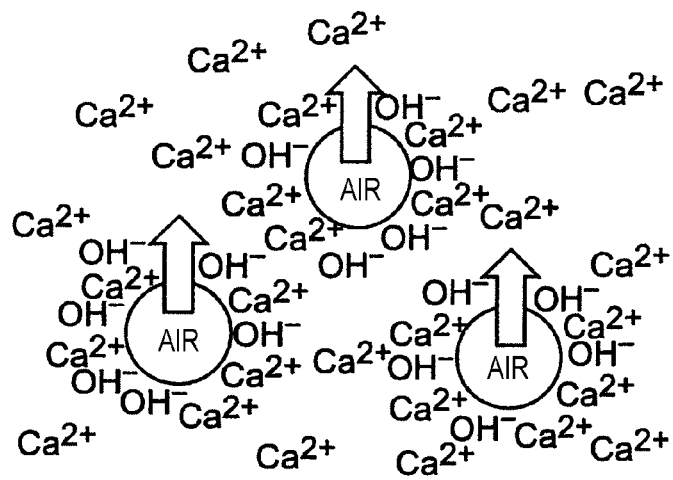
FIG. 2 is a schematic for explaining a hypothetical principle of adsorption of metal ions by the ion removing system according to the first embodiment.

As shown in FIG. 2, when the fine bubbles containing air are supplied into the hard water, $H^+$ (hydrogen ions) and $OH^-$ (hydroxide ions) are mixed on surfaces of the fine bubbles, and $H^+$ is positively charged, and $OH^-$ is negatively charged (only $OH^-$ is shown in FIG. 2). On the other hand, the hard water has $Ca^{2+}$ and $Mg^{2+}$ present as positively charged metal ions. In the following description, $Ca^{2+}$ will be described as an example of the metal ions.

$Ca^{2+}$ having a positive charge is adsorbed by $OH^-$ present on the surfaces of the fine bubbles due to an action of an intermolecular force (interionic interaction). $Ca^{2+}$ can be adsorbed to the fine bubbles in this way. Although $H^+$ repelling $Ca^{2+}$ is present on the surfaces of the fine bubbles, it is probable that $OH^-$ preferentially acts on $H^{2+}$ to $H^+$ and adsorbs $Ca^{2+}$. This "adsorption of metal ions" is mainly performed in the ion removing apparatus 3.

(2) Crystallization of Metal Ions

Figure 3:
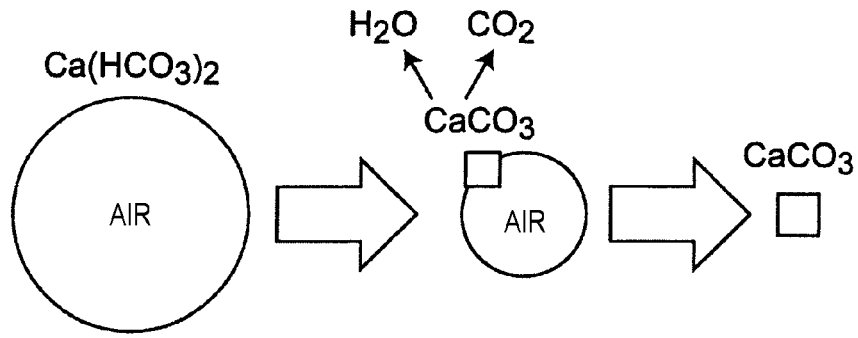
FIG. 3 is a schematic for explaining a hypothetical principle of crystallization of metal ions by the ion removing system according to the first embodiment.

In addition to the reaction shown in FIG. 2, a reaction shown in FIG. 3 is promoted by supplying the fine bubbles containing air into the hard water. Specifically, unlike ordinary bubbles, the fine bubbles supplied into the hard water hardly float to the surface, dissolve into the hard water, and therefore gradually shrink as shown in FIG. 3 due to an increase in surface tension. As described above, $Ca^{2+}$ is adsorbed on the surfaces of the fine bubbles. More specifically, $Ca^{2+}$ is present as calcium ions of soluble $Ca(HCO_3)_2$ (calcium hydrogencarbonate). As the fine bubbles gradually shrink, the dissolved concentration of $Ca^{2+}$ on the surfaces of the fine bubbles increases. The increase in the dissolved concentration results in a supersaturation state at a certain point, and $Ca^{2+}$ is crystallized and deposited. This is represented by a specific chemical formula as in Formula 1 below.

$$Ca(HCO_3)_2 \rightarrow CaCO_3 + CO_2 + H_2O \quad \text{(Formula 1)}$$

$CaCO_3$ (calcium carbonate) is insoluble (water-insoluble) and is therefore deposited as crystals of a metal component. As a result, those dissolved as $Ca^{2+}$ of $Ca(HCO_3)_2$ are deposited as crystals of the metal component. By promoting such a reaction, $CaCO_3$ deposited by crystallizing $Ca^{2+}$ of metal ions can be separated from the hard water. This "crystallization of metal ions" is mainly performed in the separating part 4A of the separating apparatus 4.

Although a reaction may occur in the reverse direction of Formula 1 in the same water, it is presumed that the reaction in the direction of Formula 1 is preferentially performed in the equilibrium relationship by continuously supplying the fine bubbles.

In the first embodiment, since the separating apparatus 4 is a cyclone-type centrifugal separating apparatus, the crystals of the metal component are deposited in the vicinity of the inner circumferential surface 4Aa of the separating part 4A and stored in the crystal storage part 4B. The crystals of the metal component stored in the crystal storage part 4B are discharged through the discharge flow path 4Ba by opening the opening/closing valve 10. By separating the crystal of the metal component from inside the hard water in this way, the hard water can be softened.

<Regeneration Treatment>

The principle of the regeneration treatment using fine bubbles will be described in more detail.

By performing the softening treatment, a portion of $CaCO_3$ deposited by crystallizing the metal ions adheres to the inner circumferential surface 4Aa of the separating part 4A. The regeneration treatment is performed as a treatment for returning $CaCO_3$ to $Ca(HCO_3)_2$. Specifically, the fine bubble generating part 3B generates fine bubbles containing carbon dioxide, which is a gas different from that used during the softening treatment.

Figure 4:
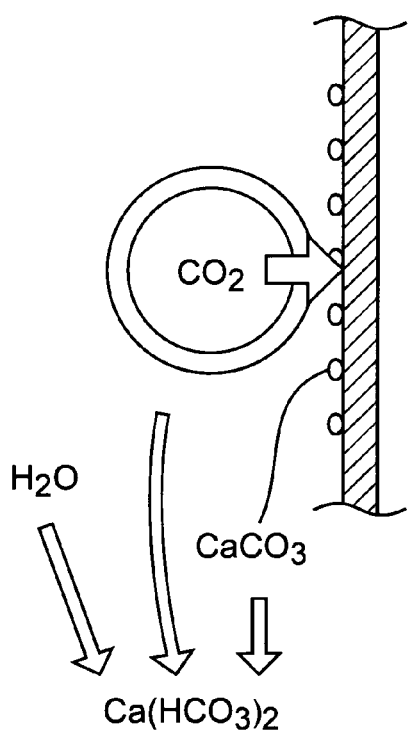
FIG. 4 is a schematic for explaining a hypothetical principle of a regeneration treatment by the ion removing system according to the first embodiment.

As shown in FIG. 4, by supplying the fine bubbles of carbon dioxide to $CaCO_3$ adhering to the inner circumferential surface 4Aa of the separating part 4A, the following reaction is promoted.

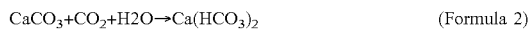

$$CaCO_3 + CO_2 + H2O \rightarrow Ca(HCO_3)_2 \quad \text{(Formula 2)}$$

The reaction generates soluble (water-soluble) $Ca(HCO_3)_2$ from insoluble $CaCO_3$. $Ca(HCO_3)_2$ dissolves into water and moves to the crystal storage part 4B. The $Ca(HCO_3)_2$ having moved to the crystal storage part 4B is discharged through the discharge flow path 4Ba by opening the opening/closing valve 10. As a result, the insoluble $CaCO_3$ adhering to the inner circumferential surface 4Aa of the separating part 4A can be discharged to the outside to restore the original state. Subsequently, the softening treatment described above can be performed again.

Although $Ca^{2+}$ is described as an example of the metal ions in the above description, it is presumed that the same reaction occurs with $Mg^{2+}$.

As described above, when metal ions are removed from hard water by using an ion exchange resin, a large amount of salt water is required for regenerating the ion exchange resin. In this regard, the ion removing system 1 of the first embodiment removes the metal ions from the hard water by using the fine bubbles and therefore can eliminate the need for a large amount of salt water required for regenerating the ion exchange resin. This can simplify the regeneration treatment to make the maintenance easier. Additionally, since regeneration wastewater containing salt water is not generated, soil pollution and a load on sewage treatment can be suppressed to improve environmental properties. Furthermore, concentration of sodium ions is not increased in treated water, so that the generated treated water can be and used as drinking water.

Additionally, the ion removing system 1 of the first embodiment uses air as the ion removal gas and therefore can suppress the cost required for generating the fine bubbles to an extremely low level.

Furthermore, the ion removing system 1 of the first embodiment performs the regeneration treatment by supplying the fine bubbles of carbon dioxide as the dissolution gas after removal of the metal ions. This can promote the reaction of generating soluble $Ca(HCO_3)_2$ from insoluble $CaCO_3$ to promote the regeneration treatment.

EXPERIMENTAL EXAMPLE 1

Experimental Example 1 performed to confirm the principle of the softening treatment using fine bubbles will be described. Experiments were conducted by using an apparatus 20 shown in FIGS. 5A and 5B.

Figure 5A:
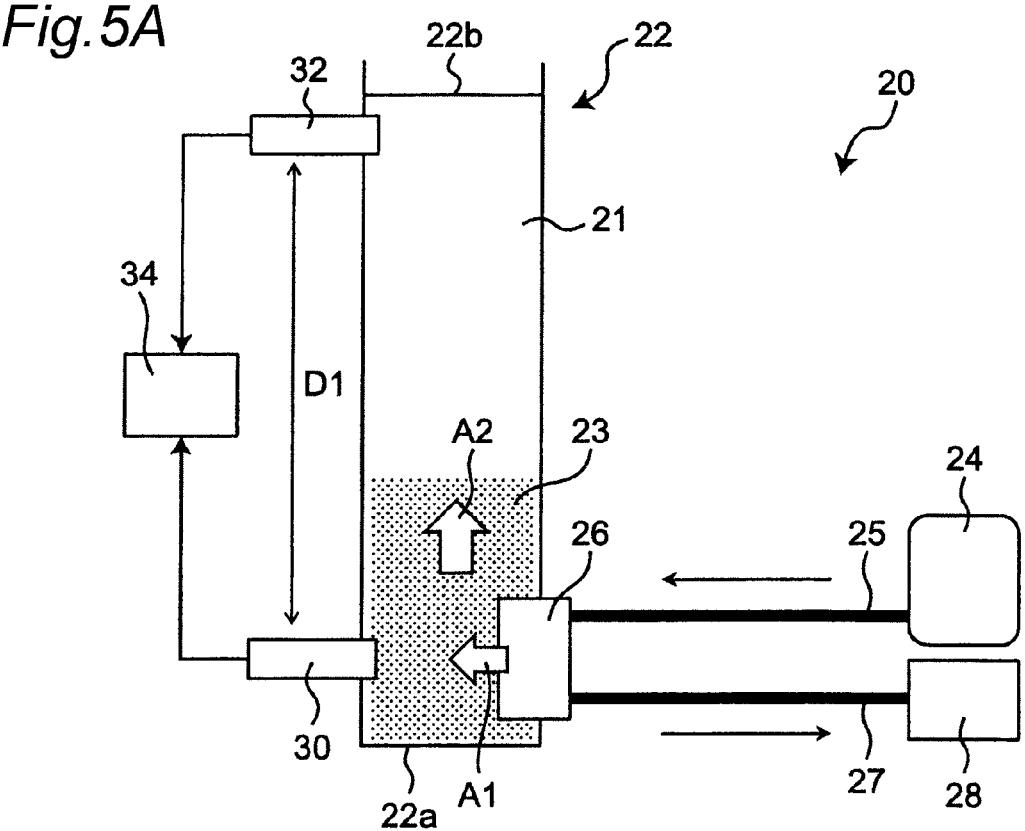
FIG. 5A is a diagram showing a schematic configuration of an apparatus used in Experimental Example 1, showing a state after a predetermined time has elapsed from generation of fine bubbles.
Figure 5B:
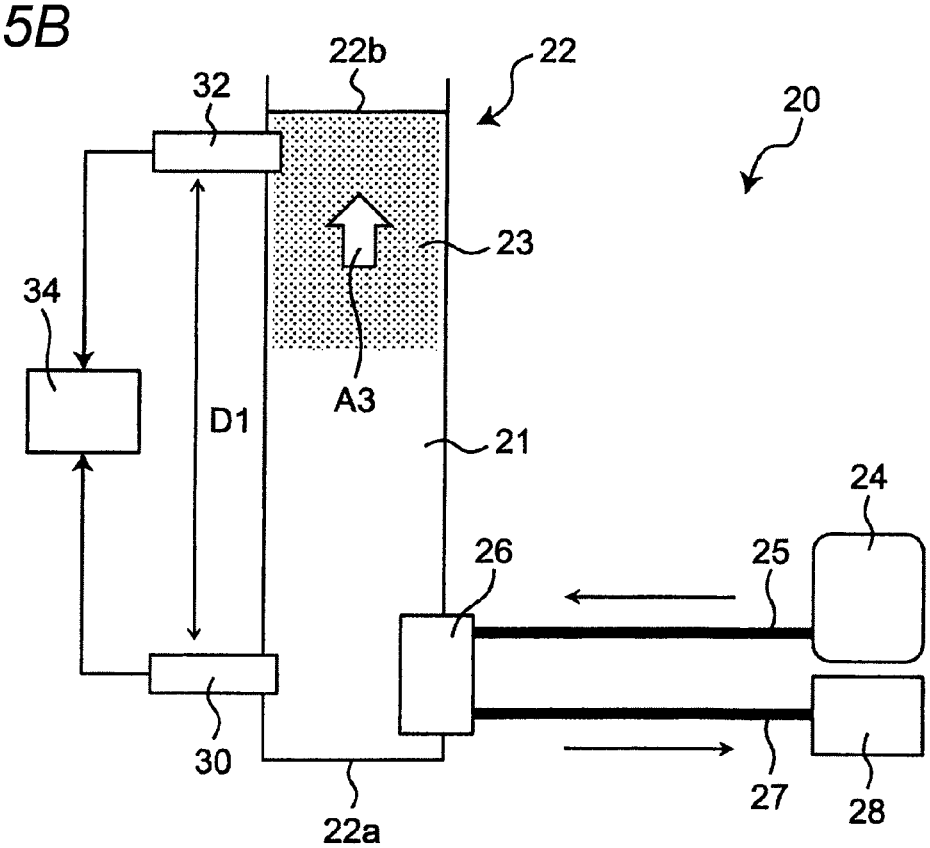
FIG. 5B is a diagram showing the schematic configuration of the apparatus used in Experimental Example 1, showing a state after a predetermined time has further elapsed from the state shown in FIG. 5A.

FIGS. 5A and 5B are diagrams showing a schematic configuration of the apparatus 20 used in Experimental Example 1. FIG. 5A shows a state after a predetermined time has elapsed (specifically, after 15 seconds have elapsed) from generation of fine bubbles, and FIG. 5B shows a state after a predetermined time has further elapsed (specifically, after 45 seconds have elapsed) from the state shown in FIG. 5A. The state of FIG. 5A corresponds to a state when the elapsed time from the generation of fine bubbles is 15 seconds in FIG. 6, and the state of FIG. 5B corresponds to a state when the elapsed time from the generation of fine bubbles is 60 seconds in FIG. 6.

The apparatus 20 shown in FIGS. 5A and 5B is an experimental apparatus capable of supplying fine bubbles 23 from the bottom surface side in a water tank 22 (hard water storage part) storing the hard water 21. In the apparatus 20, the concentration of metal ions in the hard water 21 can be measured at two positions on the bottom surface side and the water surface side. When the apparatus 20 as described above was used to supply the fine bubbles 23 into the water tank 22 and concentration transitions of metal ions were detected on the bottom surface side and the water surface side, results shown in FIG. 6 were obtained.

Figure 6:
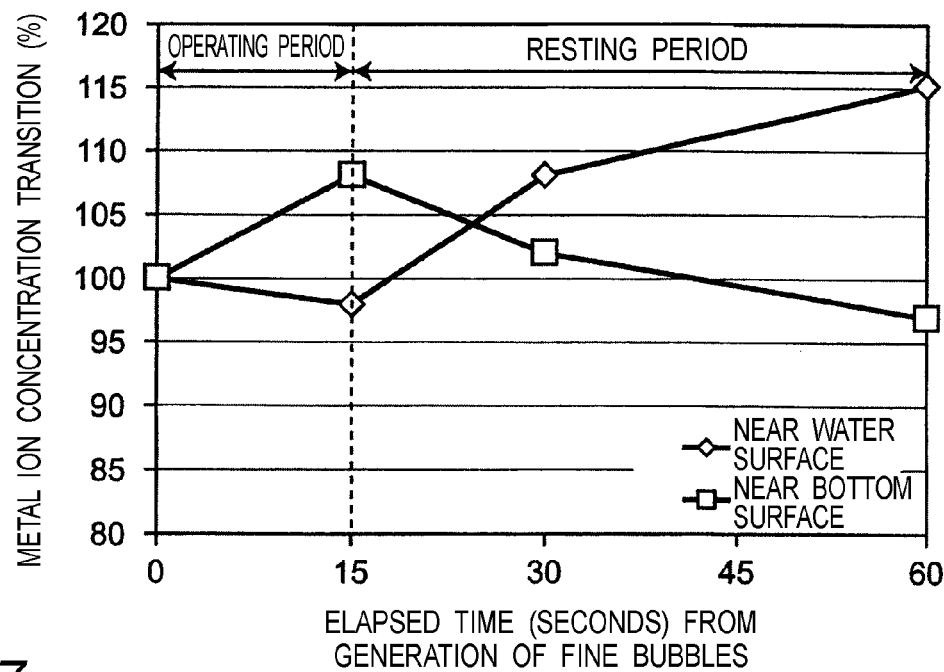
FIG. 6 is a diagram showing results of Experimental Example 1.

From the results shown in FIG. 6, the effect of "adsorption of metal ions by fine bubbles" described above could be verified. Specific results will be described later.

As shown in FIGS. 5A and 5B, the apparatus 20 includes the water tank 22, a gas supply part 24, a first piping 25, a fine bubble generating part 26, a second piping 27, a pump 28, a first water intake part 30, a second water intake part 32, and a metal ion concentration detector 34.

The water tank 22 is a water tank storing the hard water 21. In the example shown in FIGS. 5A and 5B, the water tank 22 is configured as a tank elongated in a vertical direction. The gas supply part 24 is a member supplying a gas to the fine bubble generating part 26 via the first piping 25. The fine bubble generating part 26 is an apparatus generating the fine bubbles 23 from the gas supplied from the gas supply part 24. The fine bubble generating part 26 corresponds to the fine bubble generating part 3B described above. The gas is supplied from the gas supply part 24 to the fine bubble generating part 26 due to an action of negative pressure from the pump 28 via the second piping 27.

The first water intake part 30 is a member taking sample water of the hard water 21 from near a bottom surface 22a of the water tank 22. The second water intake part 32 is a member taking sample water from near a water surface 22b of the water tank 22. The height positions of the first water intake part 30 and the second water intake part 32 may be set to any positions, and a distance D1 from the first water intake part 30 to the second water intake part 32 can be adjusted to a desired value.

In the example shown in FIGS. 5A and 5B, the height position of the first water intake part 30 is set to substantially the same position as the height position where the fine bubble generating part 26 generates the fine bubbles 23.

The metal ion concentration detector 34 is a member detecting the concentration of metal ions in the sample water taken from the first water intake part 30 and the second water intake part 32.

When the fine bubble generating part 26 and the pump 28 are operated in the configuration, the gas is supplied from the gas supply part 24 via the first piping 25 to the fine bubble generating part 26 due to the action of negative pressure from the pump 28 via the second piping 27. The fine bubble generating part 26 uses this gas as a raw material to generate and supply the fine bubbles 23 to the water tank 22 (arrow A1 of FIG. 5A).

The fine bubble generating part 26 and the pump 28 are operated for a predetermined period (15 seconds in Experimental Example 1) to continuously generate the fine bubble 23.

Subsequently, the operation of the fine bubble generating part 26 and the pump 28 is stopped. The stop of the operation is followed by a predetermined resting period (45 seconds in Experimental Example 1).

As shown in FIG. 5A, at the end of the operating period (after 15 seconds from the generation of the fine bubbles), it was visually confirmed that the fine bubbles 23 supplied into the water tank 22 moved upward in the hard water 21 (arrow A2) and were retained in a lower portion of the water tank 22.

As shown in FIG. 5B, at the end of the resting period (after 60 seconds from the generation of fine bubbles), it was visually confirmed that the fine bubbles 23 supplied into the hard water 21 further moved upward to reach the water surface 22b (arrow A3) and were retained in an upper portion of the water tank 22.

The sample water was extracted from the first water intake part 30 and the second water intake part 32 at a predetermined timing during the operation to measure the metal ion concentration with the metal ion concentration detector 34, and the results are shown in FIG. 6.

Specific experimental conditions related to the results of FIG. 6 are listed below.

(Experimental Conditions)
Type of gas supplied by the gas supply part 24: air
Hardness of the hard water 21: about 300 mg/L
Temperature of the hard water 21: 25° C.
Distance D1 from the first intake part 30 to the second intake part 32: about 1 m
Operating period of the fine bubble generating part 26 and the pump 28: 15 seconds
Resting period of the fine bubble generating part 26 and the pump 28: 45 seconds
Metal ion concentration detector 34: LAQUA F-70 manufactured by HORIBA, Ltd.
Metal ion to be measured: $Ca^{2+}$
Sample water extraction timing: after 0 seconds, 15 seconds, 30 seconds, 60 seconds from the start of operation In FIG. 6, the horizontal axis represents an elapsed time (seconds) from the generation of fine bubbles, and the vertical axis represents a concentration transition (%) of metal ions ($Ca^{2+}$) detected by the metal ion concentration detector 34. The concentration transition of the metal ions represents the transition of the metal ion concentration when the metal ion concentration measured at the start of operation is 100%.

As shown in FIG. 6, the concentration in the sample water extracted from the first water intake part 30 near the bottom surface 22a of the water tank 22 increases to about 108% when 15 seconds have elapsed. During the subsequent resting period, the concentration gradually decreases and finally decreases to about 97%

On the other hand, the concentration in the sample water extracted from the second water intake part 32 near the water surface 22b of the water tank 22 is maintained at nearly 100% until 15 seconds have elapsed, then gradually increases during the resting period, and finally increases to about 115%.

The results of the concentration transitions of the metal ions and the behavior of the fine bubbles 23 are associated with each other as follows.

When 15 seconds have elapsed as shown in FIG. 5A, the metal ion concentration is increased in the sample water of the first water intake part 30 in which the fine bubbles 23 are retained. On the other hand, the metal ion concentration is almost not changed in the sample water of the second water intake part 32 in which the fine bubbles 23 are not retained.

When 60 seconds have elapsed as shown in FIG. 5B, the metal ion concentration is reduced to a little less than 100% in the sample water of the first water intake part 30 in which the fine bubbles 23 are not retained. On the other hand, the metal ion concentration is significantly increased in the sample water of the second water intake part 32 in which the fine bubbles 23 are retained.

From the results as described above, it is presumed that the metal ions $Ca^{2+}$ in the hard water 21 are adsorbed by the fine bubbles 23 and move upward together with the fine bubbles 23 going up.

Based on the presumption, the effect of "adsorption of metal ions by fine bubbles" described above was demonstrated.

SECOND EMBODIMENT

An ion removing system according to a second embodiment of the present disclosure will be described. In the second embodiment, differences from the first embodiment will mainly be described. In the second embodiment, the same or equivalent constituent elements as the first embodiment are denoted by the same reference numerals. In the second embodiment, the description overlapping with the first embodiment will not be made.

The second embodiment is different from the first embodiment in that nitrogen is used instead of air as the gas of the fine bubbles in the softening treatment.

It is presumed that by generating and supplying the fine bubbles of nitrogen from the fine bubble generating part 3B into hard water, actions described in the following sections (3), (4) are promoted in addition to "(1) Adsorption of Metal Ions" and "(2) Crystallization of Metal Ions" described above. It is noted that the present disclosure is not bound to the specific principles described in the following sections (3), (4).

(3) Promotion of Adsorption of Metal Ions

As shown in FIG. 7(a), $H^+$ and $OH^-$ are charged around the fine bubbles. As described above, positively charged $Ca^{2+}$ is adsorbed to negatively charged $OH^-$. When nitrogen is used as the fine bubbles under the circumstances described above, a reaction of Formula 3 is promoted.

$$N^{2+} + 6H^+ + 6e^- \rightarrow 2NH_3$$

$$NH_3 + H_2O \rightarrow NH_{4+} + OH^- \qquad \text{(Formula 3)}$$

As shown in FIG. 7(b), the number of $H^+$ ions is reduced relative to the number of $OH^-$ ions by promoting the reaction of Formula 3. As a result, a negative charge becomes strong in terms of the fine bubbles, so that $Ca^{2+}$ having a positive charge is easily adsorbed.

When nitrogen is used as in the second embodiment, the reaction of Formula 3 can be promoted as compared to when air is used as in the first embodiment, so that the adsorption of metal ions is further promoted. As a result, more metal ions can be separated and removed from hard water.

The principle is presumed to be applicable not only to nitrogen but also to any gas that can react with $H^+$ ions to reduce the number of $H^+$ ions relative to the number of $OH^-$ ions.

(4) Promotion of Crystallization of Metal Ions

Since nitrogen is an inert gas different from air, when nitrogen is supplied into hard water, balance of partial pressure is lost in the gas contained in the hard water. This promotes a reaction as shown in FIG. 8.

Figure 8:
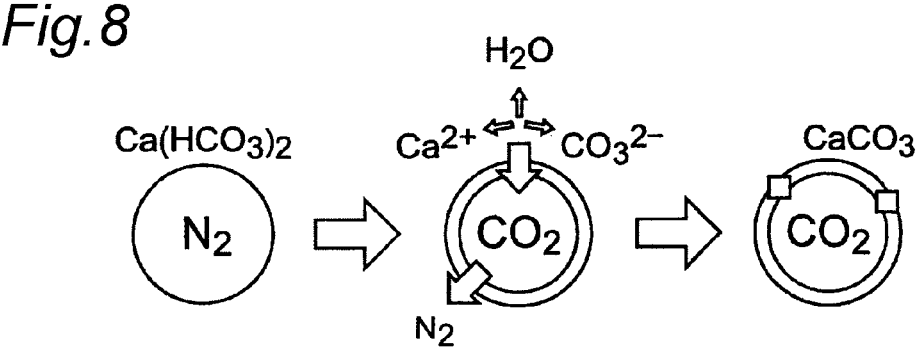
FIG. 8 is a schematic for explaining a hypothetical principle of crystallization of metal ions by the ion removing system according to the second embodiment.

As shown in FIG. 8, another gas component dissolved in hard water acts on the fine bubbles composed of nitrogen to replace nitrogen. In the example shown in FIG. 8, $CO_2$ is contained in $Ca(HCO_3)_2$ present around the fine bubbles, and this $CO_2$ is extracted and acts to replace nitrogen. Specifically, the following reaction is promoted.

$$Ca(HCO_3)_2 \rightarrow CaCO_3 + CO^2 + H_2O \qquad \text{(Formula 4)}$$

As described above, a reaction occurs such that insoluble $CaCO_3$ is generated from soluble $Ca(HCO_3)_2$. In this case, $CO_2$ and $H_2O$ are generated. $CaCO_3$ is insoluble and is thereof deposited as crystals of a metal component.

The metal ions contained as $Ca^{2+}$ of $Ca(HCO_3)_2$ in hard water can be crystallized and deposited by the reaction. As a result, the crystals of the metal component can be removed from the hard water.

The principle is presumed to be applicable not only to nitrogen but also to any gas other than air that can break the balance of partial pressure of the gas dissolved in hard water.

Since the fine bubbles are generated by taking in nitrogen and supplied into the hard water in the second embodiment as described above, the actions described in the sections of "(3) Promotion of Adsorption of Metal Ions" and "(4) Promotion of Crystallization of Metal Ions" can be promoted as compared to when air is used. This can improve the accuracy of removal of metal ions from hard water.

THIRD EMBODIMENT

A method for removing metal ions by an ion removing system according to the third embodiment of the present disclosure will be described. In the third embodiment, differences from the first and second embodiments will mainly be described, and the description overlapping with the first and second embodiments will not be made.

While the fine bubble generating part 3B generates fine bubbles containing air in the first and second embodiments, the third embodiment is different from the first and second embodiments in that fine bubbles containing a mixed gas obtained by mixing multiple types of gases are generated.

The mixed gas used for generating the fine bubbles in the third embodiment is a gas obtained by mixing two types of gases, i.e., a first gas that is a basic gas and a second gas that is a gas having a property of slower dissolution rate than the first gas. Therefore, the ion removal gas supply part 7 shown in FIG. 1 supplies the mixed gas obtained by mixing the first gas and the second gas, as the ion removal gas to the fine bubble generating part 3B.

It is presumed that by generating the fine bubbles with the mixed gas containing the first gas and the second gas, actions described in the following sections (5), (6) are promoted in addition to "(1) Adsorption of Metal Ions" and "(2) Crystallization of Metal Ions" described above. It is noted that the present disclosure is not bound to the specific principles described in the following sections (5), (6).

(5) Potential Change on Surfaces of Fine Bubbles Due to First Gas

The first gas contained in the mixed gas is a basic gas receiving $H^+$ in an acid-base reaction. The first gas dissolves in water to generate $OH^-$. Specifically, the reaction of Formula 5-1 is caused.

$$X + H_2O \rightarrow XH^+ + OH^- \qquad \text{(Formula 5-1)}$$

Figure 9:
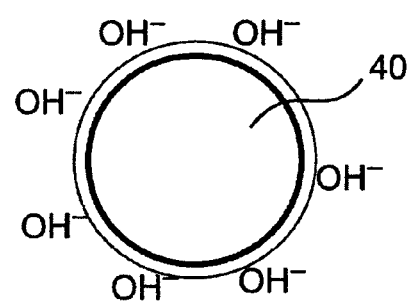
FIG. 9 is a schematic for explaining a hypothetical principle of adsorption of metal ions by an ion removing system according to a third embodiment.

In Formula 5-1, the first gas is represented by Chemical Formula X, When the reaction of the formula 5-1 occurs, as shown in FIG. 9, the proportion of $OH^-$ present around fine bubbles 40 increases as compared to the proportion of $H^+$ ($H^+$ is not shown in FIG. 9). A potential of a solid-liquid interface strongly depends on pH in water quality since $H^+$ and OH— in water are potential-determining ions, and a positive charge becomes stronger as $H^+$ increases while a negative charge becomes stronger as $OH^-$ increases. As a result, a negative charge becomes strong in terms of the fine bubbles 40, so that $Ca^{2+}$ having a positive charge is easily adsorbed. In this way, the metal ion adsorption effect of the fine bubbles 40 can be improved.

Furthermore, in the third embodiment, the basic gas of ammonia is used as the first gas. When ammonia is used, Formula 5 is specifically described as in Formula 6.

$$NH^3 + H^2O \rightarrow NH_4^+ + OH^- \qquad \text{(Formula 6)}$$

By generating the fine bubbles 40 using ammonia, which is a versatile gas having high solubility in water, the generation cost of the fine bubbles 40 can be reduced while the metal ion adsorption effect described above is improved.

The principle is presumed to be applicable not only to ammonia but also to any basic gas. Examples of such a basic gas include methylamine, ethylamine, propylamine, isopropylamine, butylamine, hexylamine, cyclohexylamine, dimethylamine, diethylamine, diisopropylamine, dipropylamine, di-n-butylamine, ethanolamine, diethylethanolamine, dimethylethanolamine, ethylenediamine, dimethylaminopropylamine, N,N-dimethylethylamine, trimethylamine, triethylamine, tetramethylenediamine, diethylenetriamine, propyleneimine, pentamethylenediamine, hexamethylenediamine, morpholine, N-methylmorpholine, and N-ethylmorpholine.

As shown in Formula 5-1, X is not limited to a basic gas, and it is probable that the same effect is produced as long as X is a "hydroxyl ion donating gas" reacting with water ($H_2O$) to donate a hydroxyl ion ($OH^-$). Examples of the hydroxyl ion donating gas include a soluble ozone gas ($O_3$). When the ozone gas is supplied to water, the reaction represented by Formula 5-2 similar to Formula 5-1 probably occurs.

$$O_3 + H_2O + 2e^- \rightarrow O^2 + 2OH^- \quad \text{(Formula 5-2)}$$

According to Formula 5-2, it is probable that the hydroxyl ion donating gas "X" causing the reaction represented by Formula 5-3 produces the same effect.

$$XO + H_2O + 2e^- \rightarrow X + 2OH^- \quad \text{(Formula 5-3)}$$

Ozone will be described in Experimental Example 6.

(6) Maintenance of Fine Bubbles with Second Gas

As described in the section of "(5) Potential Change on Surfaces of Fine Bubbles Due to First Gas", the first gas is the basic gas contained in the mixed gas and dissolves in water to increase the proportion of OH— on the surfaces of the fine bubbles 40. Such a first gas is mixed with the second gas that is a gas having a property of slower dissolution rate than the first gas. By mixing with such a second gas, the fine bubbles 40 are prevented from being entirely dissolved in water even when the first gas is dissolved in water, so that the state of the fine bubbles 40 can be maintained. By maintaining the state of the fine bubbles 40, the adsorption effect on $Ca^{2+}$ ions attributable to the fine bubbles described in the first and second embodiments can be maintained.

In the third embodiment, nitrogen is used as the second gas, By generating the fine bubbles 40 using nitrogen, which is a versatile gas harmless to the human body, the generation cost of the fine bubbles 40 can be reduced while safety is secured. Moreover, since nitrogen is a non-water-soluble gas (non-soluble gas), the effect of maintaining the state of the fine bubbles 40 can more effectively be exerted.

The principle is presumed to be applicable not only to nitrogen but also to any gas having a property of slower dissolution rate than the first gas, which is a basic gas. When the second gas is selected, a gas to be selected may be a gas having a rate of dissolution (solubility) into water slower (lower) than the first gas under the same conditions including temperature and pressure conditions, Examples of such a second gas include nitrogen, hydrogen, carbon monoxide, butane, oxygen, methane, propane, ethane, nitric oxide, ethylene, propene, acetylene, and carbon dioxide in ascending order solubility. Among them, when a non-water-soluble gas of nitric oxide, oxygen, or hydrogen is used, the effect of maintaining the state of the fine bubbles 40 can more effectively be exerted.

Figure 7:
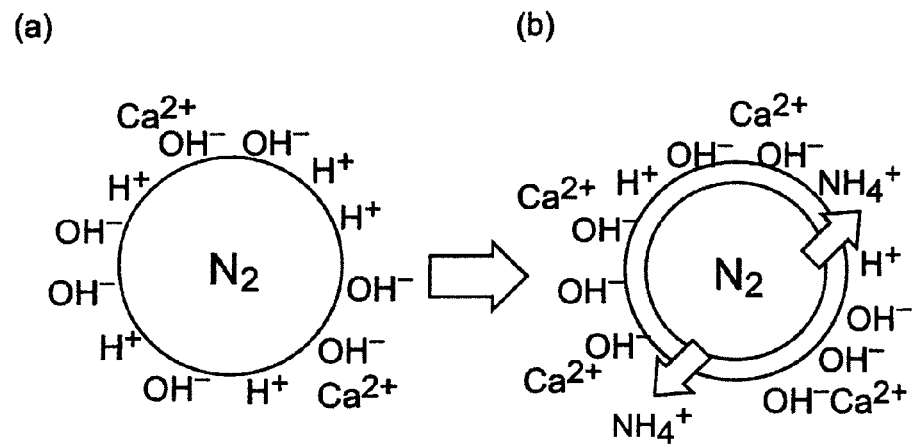
FIG. 7 is a schematic for explaining a hypothetical principle of adsorption of metal ions by an ion removing system according to a second embodiment.

It has been described in the sections of "(3) Promotion of Adsorption of Metal Ions" and "(4) Promotion of Crystallization of Metal Ions" that nitrogen dissolves into hard water with reference to FIGS. 7 and 8, and this reaction probably occurs at the same time. Nitrogen is insoluble in water and therefore difficult to dissolve in water so that a strong effect of maintaining the state of the fine bubbles 40 is exerted; however, no small amount of nitrogen dissolves in water. Therefore, the phenomenon of dissolution of nitrogen into water described in the sections of "(3) Promotion of Adsorption of Metal Ions" and "(4) Promotion of Crystallization of Metal Ions" occurs to no small extent simultaneously with the phenomenon of maintenance of the fine bubbles with nitrogen described in the sections of "(6) Maintenance of Fine Bubbles with Second Gas".

As described above, the fine bubble generating part of the third embodiment generates the fine bubbles 40 from a mixed gas obtained by mixing the first gas reacting with water to donate hydroxyl ions and the second gas having a property of slower dissolution rate than the first gas. The first gas is a hydroxyl ion donating gas and reacts with water to increase the proportion of $OH^-$ on the surfaces of the fine bubbles 40. This can increase the effect of adsorbing metal ions such as $Ca^{2+}$ to the fine bubbles 40. Furthermore, by mixing the second gas having a property of slower dissolution rate than the first gas, the fine bubbles 40 can be prevented from being completely dissolved in water to maintain the state of the fine bubbles 40.

In the third embodiment, the first gas is a soluble basic gas (ammonia). Since the first gas is a basic gas and is first dissolved in water, and the second gas having a property of slower dissolution rate than the basic gas is negatively charged, the effect can be achieved by utilizing a difference in dissolution rate of the two gases.

Mixing proportions of ammonia and nitrogen in the fine bubbles 40 may be set to an arbitrary value or may be set, for example, such that the mixing proportion of nitrogen to ammonia becomes larger (e.g., ammonia:nitrogen is 1:99 in an amount of substance (volume ratio)). With such a setting, the increase in $OH^-$ due to the dissolution of ammonia is limited only in a region near the surfaces of the fine bubbles 40, and the proportion of $OH^-$ hardly changes at a position distant from the fine bubbles 40. This can keep the water quality of the entire water unchanged while causing a change only in the vicinity of the surfaces of the fine bubbles 40. On the other hand, by increasing the proportion of nitrogen, the state of the fine bubbles 40 can be maintained longer. In this way, the effect described above can be produced by setting the amount of substance of the second gas, which has a slower dissolution rate than the basic gas, larger than the amount of substance of the first gas, which is the basic gas, in the mixed gas. Since the amount of substance and the volume are proportional to each other under the conditions of the same temperature and the same pressure, the mixing proportions of the first gas and the second gas may be set by using either the amount of substance or the volume.

Alternatively, the mixing proportions may be set such that the mixing proportion of ammonia to nitrogen becomes larger. With such a setting, the metal ions contained in hard water can further be crystallized and removed. The principle of promotion of crystallization as described above will be described in Experimental Examples 2 to 4.

In the third embodiment, unlike a supply form in which ammonia and nitrogen are separately formed into fine bubbles and the fine bubbles are separately supplied to hard water without being mixed, the fine bubbles 40 of the mixed gas obtained by mixing ammonia and nitrogen are supplied to hard water. Such a supply form can prevent ammonia from being dissolved alone at a position distant from the fine bubbles 40, so that the function of increasing $OH^-$ only in the vicinity of the surfaces of the fine bubbles 40 can sufficiently be exerted.

A hypothetical principle will be described in terms of the metal ion adsorption effect of the fine bubbles 40 using the mixed gas obtained by mixing the first gas, which is ammonia, and the second gas, which is nitrogen, described above, in particular, until the metal ions are finally crystallized, with reference to a schematic of FIG. 10.

Figure 10:
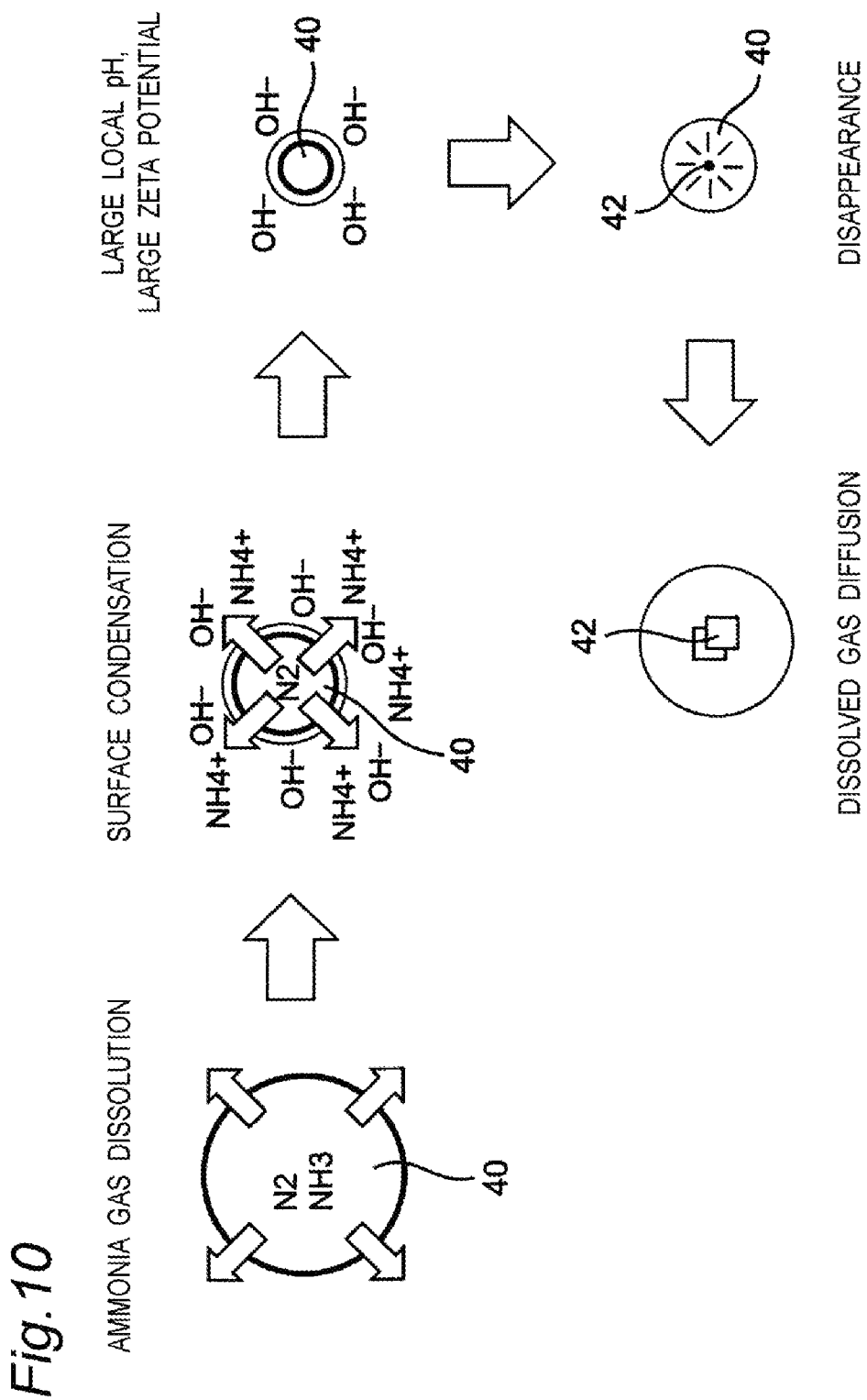
FIG. 10 is a schematic for explaining a hypothetical principle of adsorption and crystallization of metal ions by the ion removing system according to the third embodiment.

As shown in FIG. 10, when the fine bubbles 40 are supplied into hard water, ammonia is water-soluble and dissolves in surrounding water between ammonia and nitrogen constituting the fine bubbles 40 (ammonia gas dissolution). Therefore, as described in the section of "(5) Potential Change on Surfaces of Fine Bubbles Due to First Gas", $NH_4^+$ is generated on the surfaces of the fine bubbles 40 and the proportion of $OH^-$ increases (surface condensation). In this case, the effect of adsorbing $Ca^{2+}$ ions is increased.

When the surface concentration further proceeds, the concentration of $OH^-$ on the surfaces of the fine bubbles 40 is maximized. Specifically, the pH on the surfaces of the fine bubbles 40 is maximized, and the zeta potential of the fine bubbles 40 is maximized (large local pH, large zeta potential).

In the states of "ammonia gas dissolution", "surface condensation", "large local pH, large zeta potential", $Ca^{2+}$ is adsorbed by the fine bubbles 40. In this case, if the fine bubbles 40 adsorbing $Ca^{2+}$ are separated from the hard water, the metal ions can be removed from the hard water.

If the separation is not performed or if the metal ions remain as the fine bubbles 40 even though the separation is performed, crystallization of $Ca^{2+}$ adsorbed to the surfaces of the fine bubbles 40 starts. Specifically, $Ca^{2+}$ is crystallized and deposited as crystals 42. Additionally, as the crystals 42 are deposited, the fine bubbles 40 starts disappearing (disappearance).

As the crystallization of $Ca^{2+}$ and the disappearance of the fine bubbles 40 proceed, water-insoluble nitrogen maintaining the state of the fine bubbles 40 diffuses into water as a dissolved gas (dissolved gas diffusion).

In the states of "disappearance" and "dissolved gas diffusion" described above, those contained as the metal ions in the hard water are deposited as the crystals 42. By separating the crystals 42 deposited in this way from the hard water, the metal ions in the hard water can be crystallized and removed.

EXPERIMENTAL EXAMPLES 2 TO 4

Experimental Examples 2 to 4 performed to confirm the influence of the mixing proportions of ammonia and nitrogen in the fine bubbles 40 on the crystallization of the metal component will be described. Experiments were conducted by using an apparatus 50 shown in FIG. 11.

Figure 11:
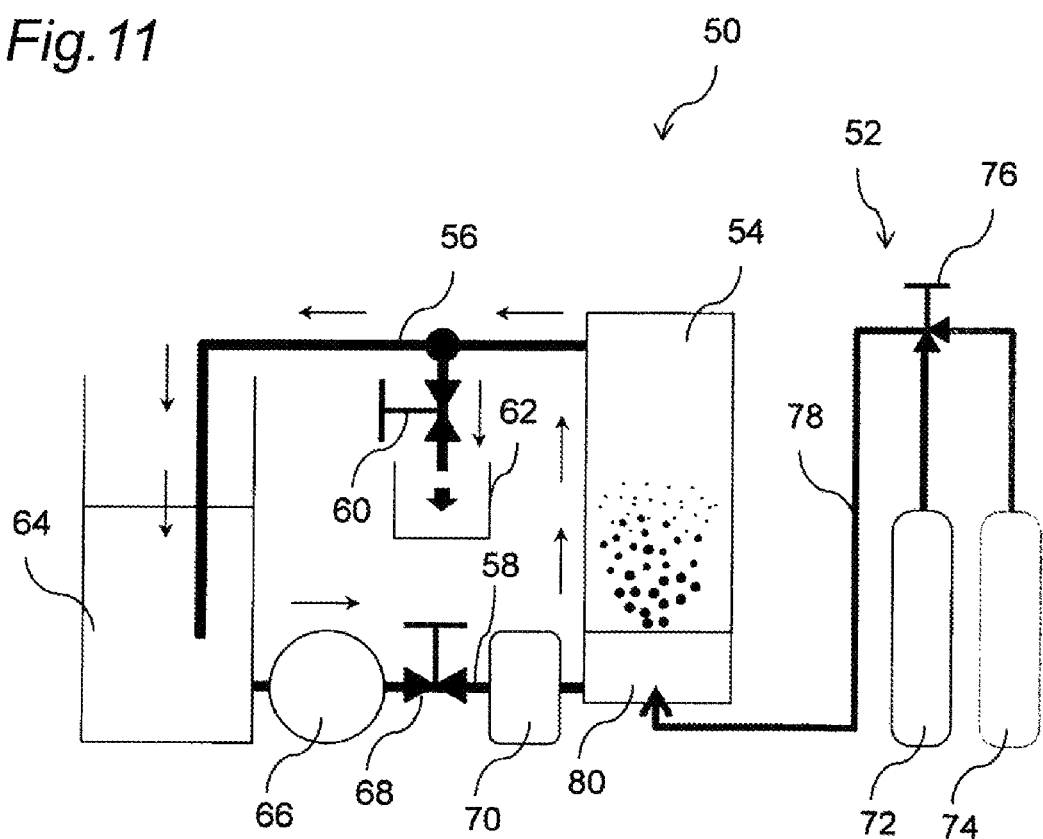
FIG. 11 is a diagram showing a schematic configuration of an apparatus used in Experimental Examples 2 to 4.

FIG. 11 is a diagram showing a schematic configuration of the apparatus 50 used in Experimental Examples 2 to 4. The apparatus 50 shown in FIG. 11 includes a mixed gas supply part 52, a treatment tank 54, a first piping 56, a second piping 58, a water sampling valve 60, a water sampler 62, and a water storage tank 64, a pump 66, a flow rate adjustment valve 68, and a flowmeter 70.

The mixed gas supply part 52 is a member supplying the mixed gas to the treatment tank 54. The mixed gas supply part 52 includes an ammonia supply source 72, a nitrogen supply source 74, a mixing ratio adjustment valve 76, a supply piping 78, and a fine bubble generating part 80.

The mixed gas supply part 52 uses the ammonia supply source 72 and the nitrogen supply source 74 to generate the mixed gas obtained by mixing ammonia (the first gas) and nitrogen (the second gas). The mixing proportions of ammonia and nitrogen can be set to any ratio by the mixing ratio adjustment valve 76. The mixed gas is supplied through the supply piping 78 to the fine bubble generating part 80 disposed in a bottom portion of the treatment tank 54. The fine bubble generating part 80 is a member forming fine bubbles of the mixed gas.

The treatment tank 54 is a tank (hard water storage part) storing hard water as treated water to be treated. By supplying the fine bubbles of the mixed gas into the hard water in the treatment tank 54, the metal component is removed, or particularly, crystallized, from the hard water, in accordance with the principle described in the third embodiment. The treated water after treatment is sent to the first piping 56. The water sampling valve 60 is disposed in the middle of the first piping 56. By opening and closing the water sampling valve 60, the treated water passing through the first piping 56 is sampled. The sampled treated water is put into the water sampler 62.

The first piping 56 is connected to the water storage tank 64. The water storage tank 64 is a tank storing the treated water. The treated water stored in the water storage tank 64 is returned through the second piping 58 to the treatment tank 54. As a result, the treated water is circulated.

The pump 66, the flow rate adjustment valve 68, and the flowmeter 70 are attached to the second piping 58. The pump 66 is a member generating a propulsive force causing the treated water in the water storage tank 64 to flow through the second piping 58. The flow rate adjustment valve 68 is a valve adjusting the flow rate of the treated water passing through the second piping 58. The flowmeter 70 is a device measuring the flow rate of the treated water flowing through the second piping 58.

The apparatus 50 as described above was used for performing a treatment of removing the metal component in the hard water in the treatment tank 54 while continuously operating the pump 66 and for collecting the treated water after the treatment from the water sampler 62 to measure various parameters. In Experimental Examples 2 to 4, a rate of crystallization of the metal component contained in the treated water (crystallization rate) was examined. The crystallization rate in this specification is not limited to a substance composed of atoms and molecules periodically arranged with regularity and means a rate of a substance simply deposited as a solid. The crystallization rate may be referred to as "deposition rate".

Figure 12:
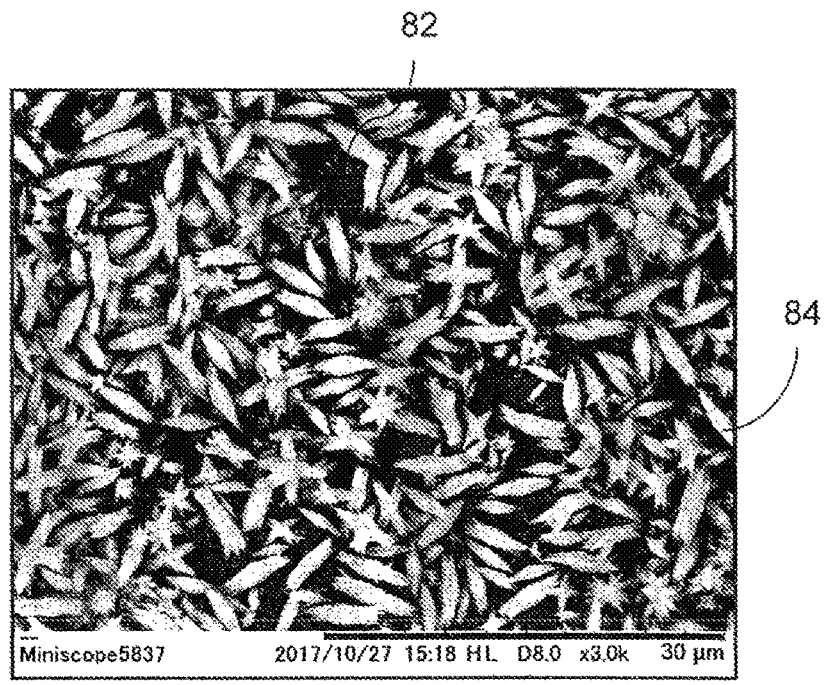
FIG. 12 is a diagram showing a state of a metal component crystallized in hard water.

FIG. 12 shows an example of a result when the treated water actually treated in Experimental Examples 2 to 4 is observed with a scanning electron microscope (SEM). As shown in FIG. 12, a multiplicity of crystals 84 is deposited in the treated water 82.

In Experimental Examples 2 and 3, hard water 1 was used as the treated water to be treated. The hard water 1 is Evian (registered trademark) having the hardness of about 300 mg/L. In Experimental Example 4, two types of hard waters 1 and 2 were used. The hard water 2 is Contrex (registered trademark) having the hardness of about 1400 mg/L.

EXPERIMENTAL EXAMPLE 2

In Experimental Example 2, the apparatus 50 described above was used for collecting the treated water after the elapse of a predetermined time as sample water with the water sampler 62 while operating the pump 66 to cause the hard water to flow into the treatment tank 54. In Experimental Example 2, the mixing proportions of ammonia and nitrogen in the mixed gas were changed to examine differences in the crystallization rate at respective mixing proportions. Specific experimental conditions of Experimental Example 2 are listed below. In Experimental Example 2, the treated water supplied from the treatment tank 54 to the first piping 56 was discarded except the water collected with the water sampler 62 and was not supplied to the water storage tank 64.

(Experimental Conditions)

Type of treated water: hard water 1

Mixing percentage of ammonia in mixed gas: 0% (nitrogen only), 30%, 40%, 50%, 60%, 70%, 80%, 90%, 100% (ammonia only)

Flow rate of treated water: 2.6 L/min

Flow rate of mixed gas: 0.03 L/min

Time from start of operation of pump to collection: 3 minutes

Measurement items of sample water: pH, Ca hardness (mg/L), total carbonic acid concentration (mg/L)

For the measurement items of the sample water, the collected sample water was filtered to remove crystals of the metal component deposited in the sample water before performing the measurement. The Ca hardness is a value obtained by converting the content of $Ca^{2+}$ contained in the treated water per unit volume into calcium carbonate ($CaCO_3$). Commercially available respective measurement devices were used for measuring the pH, Ca hardness, and total carbonic acid concentration.

Figure 13A:
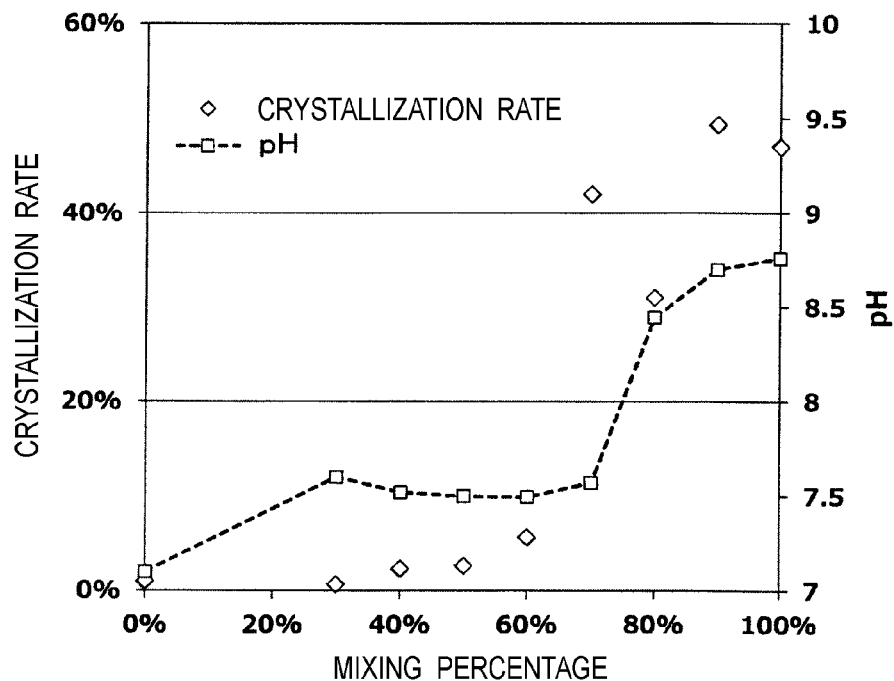
FIG. 13A is a graph showing a result of Experimental Example 2, showing a relationship between a mixing percentage of ammonia and a crystallization rate of sample water.
Figure 13B:
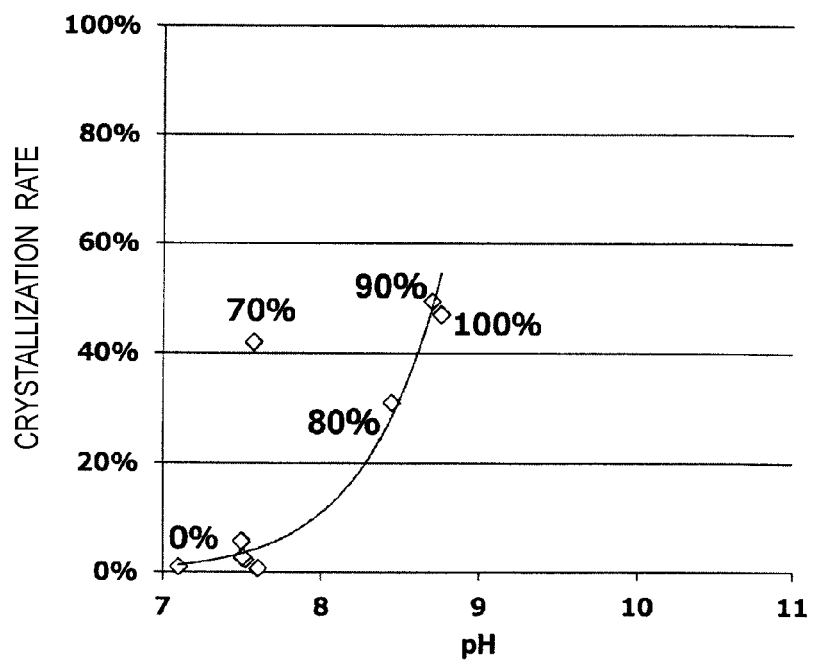
FIG. 13B is a graph showing a result of Experimental Example 2, showing a relationship between pH of the sample water and the crystallization rate of the sample water.

Experimental results of Experimental Example 2 are shown in FIGS. 13A and 13B.

In FIG. 13A, the horizontal axis represents the mixing percentage (%) of ammonia in the mixed gas, and the vertical axis represents the crystallization rate (%) of the sample water. In FIG. 13B, the horizontal axis represents the pH of the sample water, and the vertical axis represents the crystallization rate (%) of the sample water.

The "crystallization rate" was calculated by (the Ca hardness of the sample water before operation—the Ca hardness of the sample water after operation)/the Ca hardness of the sample water before operation. The crystallization rate calculated in this way represents how many metal ions are crystallized in the sample water per unit volume. A higher crystallization rate indicates that more metal ions are crystallized from the sample water.

As shown in FIGS. 13A and 13B, the crystallization rate increases as the mixing percentage of ammonia becomes higher. Particularly, when the mixing percentage of ammonia is 70% or more, the crystallization rate dramatically increases.

As shown in FIGS. 13A and 13B, it can be seen that when the mixing percentage of ammonia is higher, the pH is increased. It is noted that although the pH is increased, the maximum value is between 8.5 and 9. The pH reference value for tap water defined by the Ministry of Health, Labor and Welfare is in the range of 5.8 to 8.6, and it can be seen that even if the mixing percentage of ammonia is high, the pH varies to a value close to the range. Additionally, the desirable drinkable range of alkali ion water prescribed in Pharmaceutical Affairs Law is pH 9 to 10. Since the pH value can be kept lower than this range, it can be seen that the water is suitable as drinking water.

The factor preventing the pH from excessively increasing even at a high mixing percentage of ammonia is probably that the pH is mainly locally increased around the fine bubbles 40 as described above with reference to FIG. 10, rather than increasing the pH of the entire treated water.

EXPERIMENTAL EXAMPLE 3

In Experimental Example 3, as in Experimental Example 2, the apparatus 50 described above was used for collecting the treated water after the elapse of a predetermined time as sample water with the water sampler 62 while operating the pump 66 to cause the hard water to flow into the treatment tank 54. In Experimental Example 3, only two patterns of 70% and 100% were used for the mixing percentage of ammonia in the mixed gas. Unlike Experimental Example 2, the sample water was collected at predetermined intervals from the start of operation of the pump 66 to measure various parameters. Furthermore, unlike Experimental Example 2, the treated water supplied from the treatment tank 54 to the first piping 56 was all returned to the water storage tank 64 to circulate the treated water except the water collected with the water sampler 62. Specific experimental conditions of Experimental Example 3 are listed below.

(Experimental Conditions)

Type of treated water: hard water 1

Mixing percentage of ammonia in mixed gas: 70%, 100% (ammonia only)

Flow rate of treated water: 2.6 L/min

Flow rate of mixed gas: 0.03 L/min

Measurement items of sample water: pH, Ca hardness (mg/L), total carbonic acid concentration (mg/L)

Figure 14A:
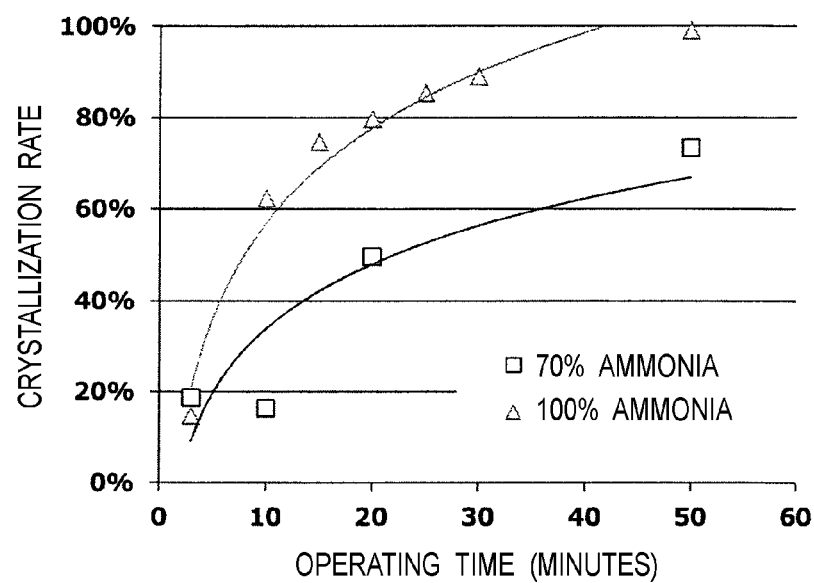
FIG. 14A is a graph showing a result of Experimental Example 3, showing a relationship between an operating time of a pump and the crystallization rate of the sample water.
Figure 14B:
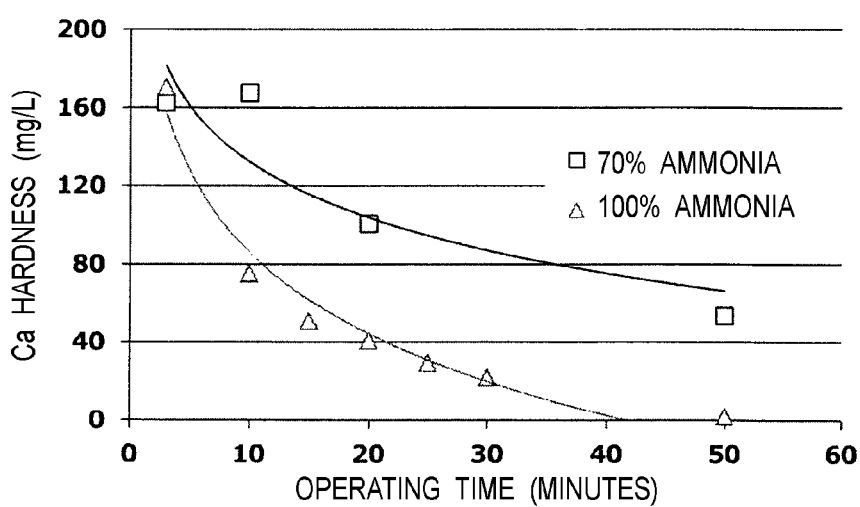
FIG. 14B is a graph showing a result of Experimental Example 3, showing a relationship between the operating time of the pump and the Ca hardness of the sample water.
Figure 14C:
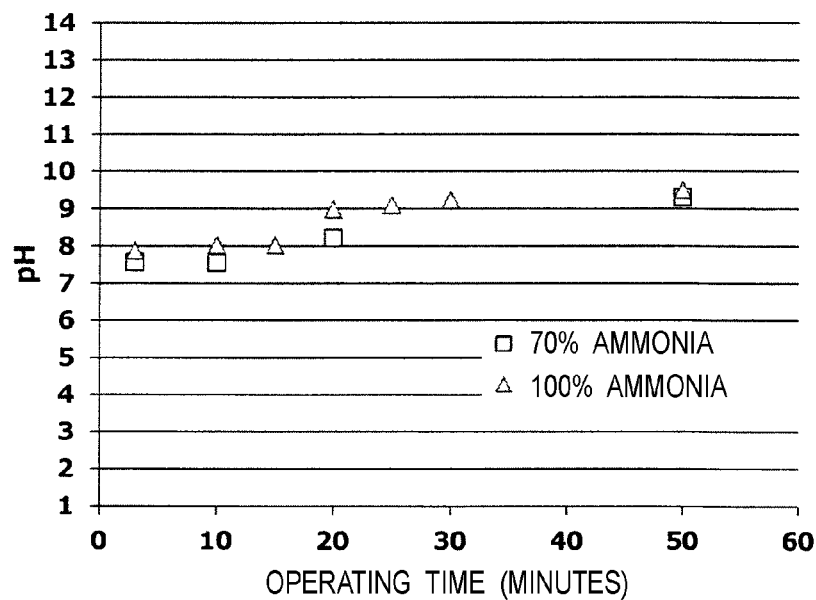
FIG. 14C is a graph showing a result of Experimental Example 3, showing a relationship between the operating time of the pump and the pH of the sample water.

Experimental results of Experimental Example 3 are shown in FIGS. 14A, 14B, and 14C.

In FIG. 14A, the horizontal axis represents the operating time (minutes) of the pump 66, and the vertical axis represents the crystallization rate (%) of the sample water. In FIG. 14B, the horizontal axis represents the operating time (minutes) of the pump 66, and the vertical axis represents the Ca hardness (mg/L) of the sample water. In FIG. 14C, the horizontal axis represents the operating time (minutes) of the pump 66, and the vertical axis represents the pH of the sample water.

As shown in FIG. 14A, the crystallization rate increases as the operating time elapses, regardless of whether the ammonia mixing percentage is 70% or 100%. As shown in FIG. 14B, the Ca hardness decreases as the operating time elapses. This reveals that the metal component $Ca^{2+}$ dissolved in the hard water is crystallized as $CaCO_3$ due to introduction of the fine bubbles using the mixed gas.

On the other hand, the increase speed of the crystallization rate and the decrease speed of the Ca hardness are faster when the mixing percentage of ammonia is 100% than when the mixing percentage is 70%. This reveals that ammonia significantly contributes to the crystallization of $Ca^{2+}$ into $CaCO_3$.

As shown in FIG. 14C, the pH gradually increases as the operating time elapses, regardless of whether the mixing percentage of ammonia is 70% or 100%. No significant difference is observed in pH value between when the mixing percentage of ammonia is 70% and when the mixing percentage is 100%, Even when the operating time of 50 minutes have elapsed, the pH is between 9 and 10 and is not excessively increased. The factor moderating the increase speed of the pH in this way is probably that the pH is mainly locally increased around the fine bubbles 40 as described above with reference to FIG. 10, rather than increasing the pH of the entire treated water.

EXPERIMENTAL EXAMPLE 4

In Experimental Example 4, as in Experimental Examples 2 and 3, the apparatus 50 described above was used for collecting the treated water after the elapse of a predetermined time as sample water with the water sampler 62 while operating the pump 66 to cause the hard water to flow into the treatment tank 54. As in Experimental Example 3, the sample water was collected at predetermined intervals from the start of operation of the pump 66 to measure various parameters. As in Experimental Example 3, the treated water supplied from the treatment tank 54 to the first piping 56 was all returned to the water storage tank 64 to circulate the treated water except the water collected with the water sampler 62. On the other hand, in Experimental Example 4, only one pattern of 70% was used for the mixing percentage of ammonia in the mixed gas. Unlike Experimental Examples 2 and 3, two kinds of hard waters, i.e., the hard water 1 (hardness: about 300 mg/L) and the hard water 2 (hardness: about 1400 mg/L), were used as the treated water. Specific experimental conditions of Experimental Example 4 are listed below.

(Experimental Conditions)
Types of treated water: hard water 1, hard water 2
Mixing percentage of ammonia in mixed gas: 70%
Flow rate of treated water: 2.6 L/min
Flow rate of mixed gas: 0.03 L/min
Measurement items of sample water: pH, Ca hardness (mg/L), total carbonic acid concentration (mg/L)

Experimental results of Experimental Example 4 are shown in FIGS. 15A, 15B, 15C, and 15D.

Figure 15A:
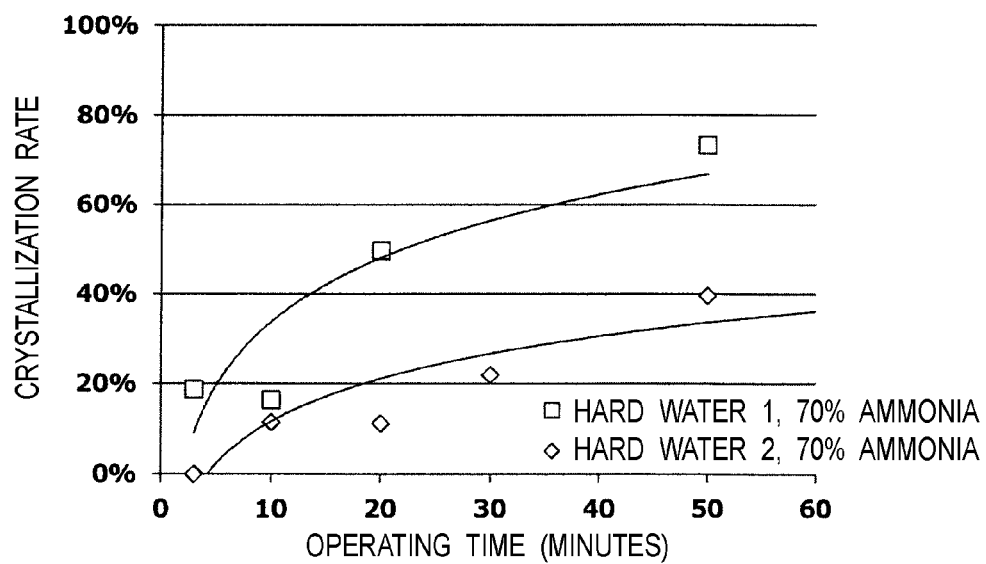
FIG. 15A is a graph showing a result of Experimental Example 4, showing a relationship between the operating time of the pump and the crystallization rate of the sample water.
Figure 15B:
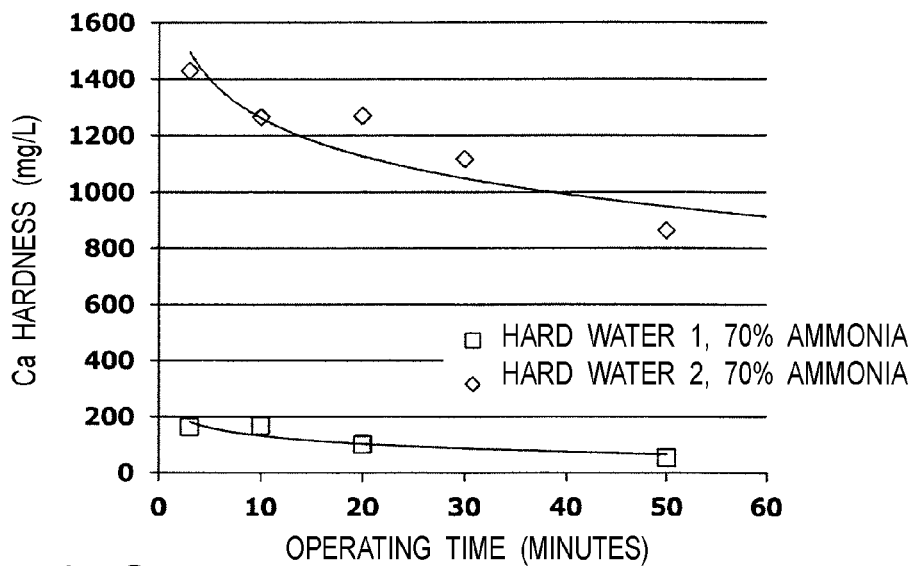
FIG. 15B is a graph showing a result of Experimental Example 4, showing a relationship between the operating time of the pump and the Ca hardness of the sample water.
Figure 15C:
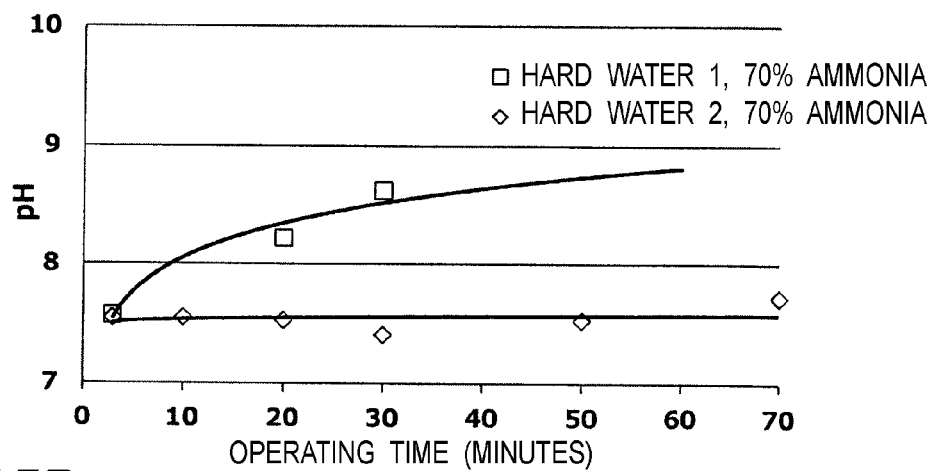
FIG. 15C is a graph showing a result of Experimental Example 4, showing a relationship between the operating time of the pump and the pH of the sample water.
Figure 15D:
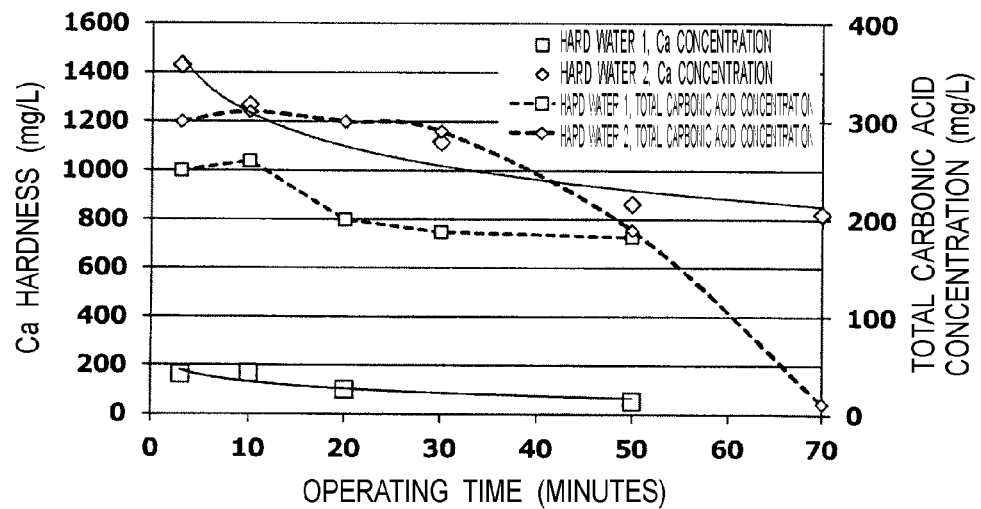
FIG. 15D is a graph showing a result of Experimental Example 4, showing a relationship between the operating time of the pump and each of the Ca hardness and the total carbonic acid concentration of the sample water.

In FIG. 15A, the horizontal axis represents the operating time (minutes) of the pump 66, and the vertical axis represents the crystallization rate (%) of the sample water. In FIG. 15B, the horizontal axis represents the operating time (minutes) of the pump 66, and the vertical axis represents the Ca hardness (mg/L) of the sample water. In FIG. 15C, the horizontal axis represents the operating time (minutes) of the pump 66, and the vertical axis represents the pH of the sample water. FIG. 15D is a graph of FIG. 15B in which the total carbonic acid concentration (mg/L) is added to the vertical axis.

As shown in FIGS. 15A and 15B, in both the hard water 1 and the hard water 2, the crystallization rate increases and the Ca hardness decreases as the operating time elapses. This reveals that the metal component $Ca^{2+}$ dissolved in the hard water is crystallized as $CaCO_3$ due to introduction of the fine bubbles using the mixed gas.

As shown in FIGS. 15A and 15C, it can be seen that the increase speed of the crystallization rate and the increase speed of the pH are significantly different between the hard water 1 and the hard water 2. Specifically, it can be seen that the increase speed of the crystallization rate and the increase speed of the pH are higher in the hard water 1 than the hard water 2. In this regard, the present inventors focused attention on "total carbonic acid concentration" and conducted a study based on data shown in FIG. 15D.

As shown in FIG. 15D, the total carbonic acid concentration of the hard water 1 has a value of 150 to 200 mg/L when the operating time is 50 minutes. Therefore, the hard water 1 contains large amounts of $HCO_3^-$ and $CO_3^{2-}$, When the operating time is 50 minutes, the crystallization rate of the hard water 1 has reached 70 to 80% as shown in FIG. 15A. On the other hand, the total carbonic acid concentration of the hard water 2 has value of about 20 mg/L when the operating time is 70 minutes. As compared to the hard water 1, it can be seen that the contents of $HCO_3^-$ and $CO_3^{3-}$ are significantly smaller in the hard water 2. According to the data shown in FIG. 15A, the crystallization rate of the hard water 2 is expected to be about 40% when the operating time is 70 minutes.

As described in the principles of the first to third embodiments, $HCO_3^-$ and $CO_3^{2-}$ function as components for crystallizing $Ca^{2+}$ as $CaCO_3$. It is probable that the increase speed of the crystallization rate is higher in the hard water 1 than hard water 2 since $HCO_3^-$ and $CO_3^{2-}$ are contained in larger amounts.

Table 1 shows contents of metal components contained in the hard waters 1, 2 and the total carbonic acid concentration.

TABLE 1

|  | content (mg/L) | | | amount of $CO_3^{2-}$ required for dissolution | | | surplus amount (mg/L) |
| --- | --- | --- | --- | --- | --- | --- | --- |
|  | Ca | Mg | $CO_3^{2-}$ | Ca | Mg | total |  |
| molecular weight | 40 | 24.3 | 60 |  | 60 |  |  |
| Contrex | 468 | 74.8 | 372 | 702 | 184.691358 | 886.691358 | −514.691 |
| Evian | 80 | 26 | 357 | 120 | 64.19753086 | 184.1975309 | 172.8025 |

As shown in Table 1, the contents of Ca, Mg, and $CO_3^{2-}$ per unit volume contained in the hard water 1, i.e., Evian (registered trademark), are 80, 26, and 357 mg/L, respectively. The contents of Ca, Mg, and $CO_3^{2-}$ per unit volume contained in the hard water 2, i.e., Contrex (registered trademark), are 468, 74.8, and 372 mg/L. Therefore, the contents of $CO_3^{2-}$ per unit volume contained in the hard water 1 and the hard water 2 are 357 mg/L and 372 mg/L, which are substantially the same. On the other hand, the amount of $CO_3^{2-}$ required for dissolution of Ca and Mg relative to the contents of Ca and Mg contained in hard water is about 184 mg/L for the hard water 1 and about 887 mg/L for the hard water 2. Therefore, the hard water 1 has surplus of about 173 mg/L of the actually contained amount of $CO_3^{2-}$ relative to the amount of $CO_3^{2-}$ required for dissolution of Ca and Mg. This means that $CO_3^{2-}$ for crystallizing $Ca^{2+}$ is abundantly present when the fine bubbles of the mixed gas are introduced. On the other hand, the hard water 2 is about 515 mg/L short of the actually contained amount of $CO_3^{2-}$ relative to the amount of $CO_3^{2-}$ required for dissolution of Ca and Mg. As a result, when the fine bubbles of the mixed gas are introduced, crystallization is probably not promoted due to short of $CO_3^{2-}$ for crystallizing $Ca^{2+}$.

From the results described above, it is probable that if the hard water to be treated abundantly contains carbonic acid such as $HCO_3^-$ and $CO_3^-$, the increase speed of crystallization can be improved. Based on this fact, to increase the total carbon dioxide content of the hard water, a carbonic acid gas may be introduced into the hard water before introducing the fine bubbles. Specifically, a carbonic acid gas generating part generating a carbonic acid gas may further be included. Before supplying the fine bubbles generated by the fine bubble generating part to the hard water, a carbonic acid gas may be generated by the carbonic acid gas generating part and supplied into the hard water. This can probably promote the crystallization of the metal component in the hard water.

As described above, according to Experimental Examples 2 to 4, the crystallization of the metal component can be promoted by setting the amount of substance of ammonia larger than the amount of substance of nitrogen in the mixed gas. Furthermore, by setting the mixing percentage of ammonia in the mixed gas to 70% or more, the crystallization of the metal component can significantly be promoted.

EXPERIMENTAL EXAMPLE 5

Experimental Example 5 is a sensory evaluation experiment for evaluating "foaming" for the sample water (soft water) treated by using the device 50 described above. The foaming is related to a foaming power according to height and size of foam generated from a water surface. It is generally considered that when an amount of hardness components is smaller, the foaming is larger, which is advantageous in that a washing effect is increased when the water is used for the purpose of washing, for example.

In Experimental Example 5, unlike Experimental Examples 2 to 4, fine bubbles were generated from a single gas of ammonia instead of the mixed gas. Specifically, in the device 50 shown in FIG. 11, fine bubbles were generated by using only the ammonia supply source 72 without using the nitrogen supply source 74. The method of using the device 50 is the same as in Experimental Examples 2 to 4 and therefore will not be described.

The experimental method of example 5 is based on the standard of "foaming": SHASE-S 218 of the Society of Heating, Air-Conditioning and Sanitary Engineers of Japan. Specifically, diluted water was prepared by diluting 1.5 g of pure soap with 200 ml of water, and 1 mL of the diluted water and 9 mL of treated water to be treated were mixed and put into a measuring cylinder as 10 mL of evaluation water. COW BRAND Soap Red Box a1 (Cow Brand Soap Kyoshinsha Co., Ltd.) was used for the pure soap, and distilled water of Autostill WG221) (Yamato Scientific Co., Ltd.) was used for 200 ml of water. The measuring cylinder was shaken 50 times, and a height of the foam from the water surface was measured after 1 minute.

In Experimental Example 5, the same experiment was performed with three types of water, i.e., hard water, tap water, and pure water, in addition to the sample water treated by the device 50. Hardnesses of these waters and the sample water are as follows.

Figure 16:
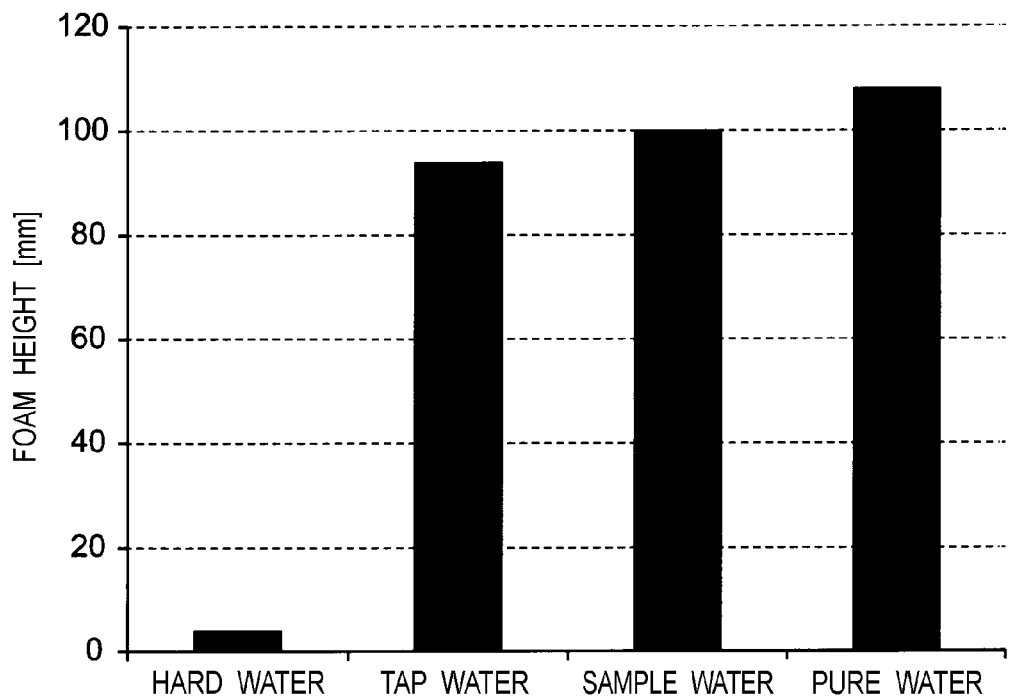
FIG. 16 is a graph showing a result of Experimental Example 5, showing a relationship between a type of water and a height of bubbles extending from a water surface of evaluation water.

Hardness of hard water: total hardness 300 mg/L, Ca hardness 200 mg/L, Mg hardness 100 mg/L Hardness of tap water: total hardness 72 mg/L, Ca hardness 49 mg/L. Mg hardness 23 mg/L Hardness of pure water: total hardness 0 mg/L, Ca hardness 0 mg/L, Mg hardness 0 mg/L Hardness of sample water: total hardness 118 mg/L, Ca hardness 21 mg/L, Mg hardness 97 mg/L Experimental results of Experimental Example 5 are shown in FIG. 16. In FIG. 16, the horizontal axis represents the type of water, and the vertical axis represents the height (mm) of the foam extending from the surface of the evaluation water. The vertical axis represents the foaming and the foaming power.

As shown in FIG. 16, while the "hard water" was highest in both the Ca hardnesses and the Mg hardnesses and showed lithe foaming close to 0, the "tap water", the "sample water", and the "pure water" showed approximately the same high levels of foaming. Therefore, the "sample water" treated by using the device 50 is improved in terms of foaming as compared to the hard water before treatment and achieves the foaming close to the "tap water" and the "pure water". This demonstrates that the foaming can be improved by removing the metal ions from the hard water with the method of the embodiments and that the foaming can be achieved at the same level as tap water and pure water, which are soft water.

Comparing the results shown in FIG. 16 with the specific values of the hardness, when the Ca hardness is lower, the foaming becomes larger. This reveals that the value of the Ca hardness rather than the Mg hardness is a dominant parameter having a direct influence on the foaming.

EXPERIMENTAL EXAMPLE 6

In Experimental Example 6, the treated water (hard water) is treated by using the same device 50 (FIG. 11) as in example 2-4 to compare the crystallization rate of the treated sample water.

In Experimental Example 6, differences in the crystallization rate were compared between the case of using microbubbles, which are fine bubbles, and the case of using milli-bubbles, which are not fine bubbles, Specifically, in the device 50 shown in FIG. 11, an experiment was performed in two patterns by using the fine bubble generating part 80 as it is to generate microbubbles, and by using another bubble generation section (not shown) instead of the fine bubble generating part 80 to generate milli-bubbles.

In Experimental Example 6, unlike Experimental Examples 2 to 4, the bubbles were generated from a single gas of ozone instead of the mixed gas. Specifically, in the device 50 shown in FIG. 11, an ozone supply source (not shown) was used instead of the ammonia supply source 72 and the nitrogen supply source 74. As described in Experimental Example 3, the ozone gas is a hydroxyl ion donating gas.

Experimental conditions of Experimental Example 6 are as follows.

Type of treated water (common): hard water 1

Flow rate of treated water (common): 12 L/min

Volume of water stored in the treatment tank 54 (common): 9L

Flow rate of ozone gas (common): 0.12 L/min

Average bubble diameter of microbubbles: 56 µm

Average bubble diameter of milli-bubbles: 1021 µm

Measurement items of sample water (common): Ca hardness (mg/L), total hardness (mg/L)

Figure 17A:
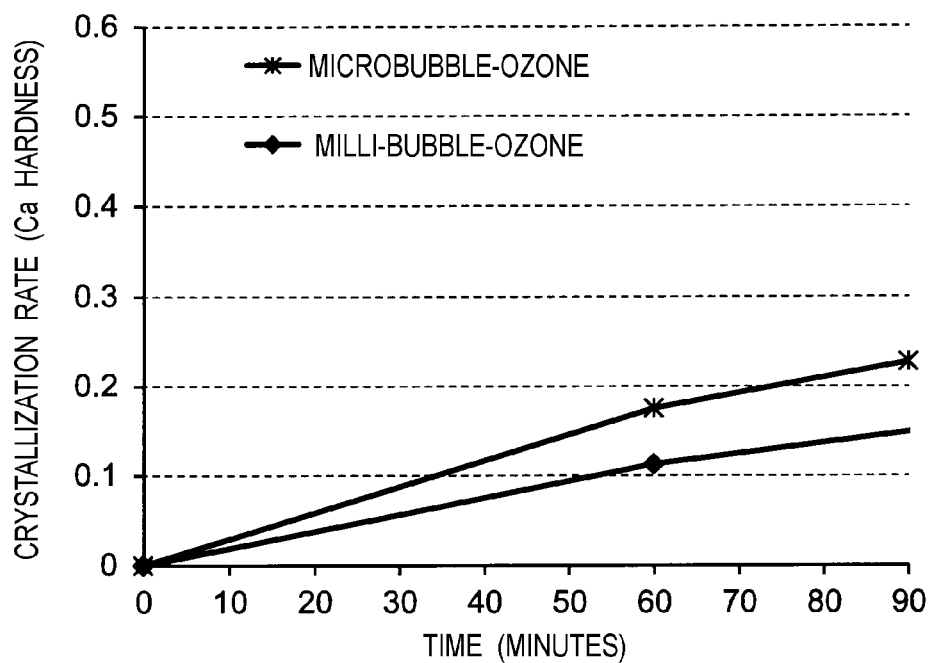
FIG. 17A is a graph showing a result of Experimental Example 6, showing a relationship between time and a crystallization rate of Ca hardness.
Figure 17B:
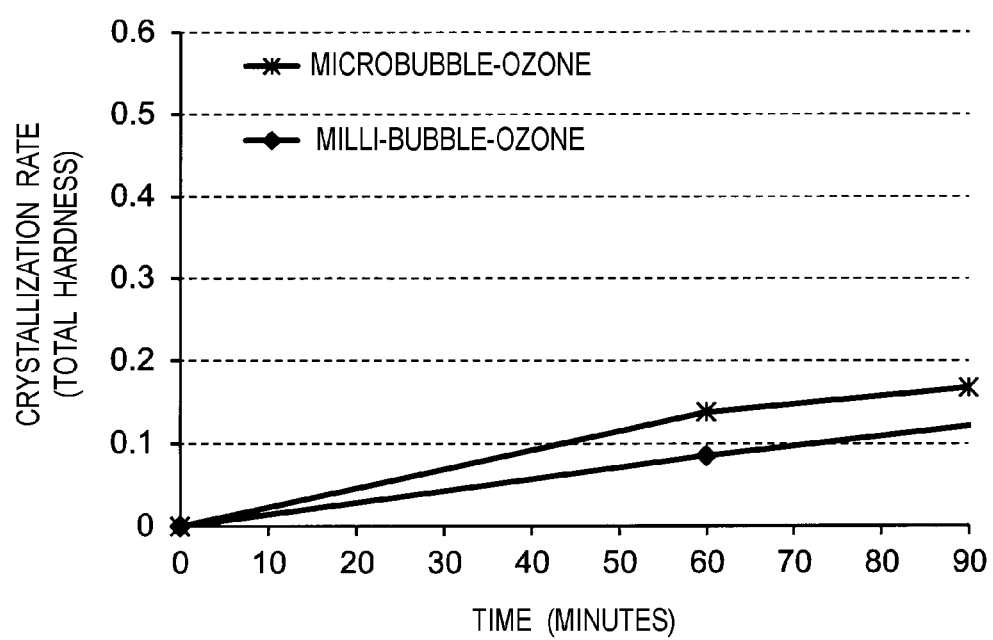
FIG. 17B is a diagram showing a result of Experimental Example 6, which is a graph showing a relationship between time and a crystallization rate of total hardness.

Experimental results of Experimental Example 6 are shown in FIGS. 17A and 17B.

In FIG. 17A, the horizontal axis represents the time (minutes), and the vertical axis represents the crystallization rate (%) of the Ca hardness. In FIG. 17B, the horizontal axis represents the time (minutes), and the vertical axis represents the crystallization rate (%) of the total hardness.

As shown in FIGS. 17A and 17B, it can be seen that the micro-bubbles achieve higher crystallization rates than the milli-bubbles for both the Ca hardness and the total hardness. Therefore, the crystallization rate is higher in the case of using the micro-bubbles, which are the fine bubbles, as compared to the case of using the milli-bubbles, which are not the fine bubbles, and this demonstrates the metal ion crystallization effect of the fine bubbles.

The present disclosure is not limited to the embodiments described above and can be implemented in various other forms. For example, in the above description, air or nitrogen is used as the ion removal gas in the softening treatment; however, the present disclosure is not limited thereto. A gas other than air or nitrogen may be used as the ion removal gas.

In the above description, carbon dioxide is used as the dissolution gas for the regeneration treatment; however, the present disclosure is not limited thereto. For example, the dissolution gas may be hydrogen sulfide ($H_2S \rightarrow H^+ + HS^-$) or hydrogen chloride ($HCL \rightarrow H^+ + CL^-$), which is a gas producing hydrogen ions when dissolved in water.

In the above description, the dissolution gas is used as an example of the solubilizer for the regeneration treatment; however, the present disclosure is not limited thereto. For example, a liquid (dissolution liquid) dissolving the crystals of the metal component may be used as the solubilizer. Examples of such a liquid include hydrochloric acid, sulfuric acid, citric acid, and ascorbic acid. By using such a liquid, the size of the solubilizer supply part 8 can be reduced. Additionally, the frequency of replacement of the solubilizer can be reduced. When a liquid is used as the solubilizer, gas can be prevented from entering the pump P, and this can eliminate the need for disposing the solubilizer supply part 8 downstream of the pump P in the flow direction of the hard water. Therefore, the solubilizer supply part 8 may be disposed in the circulation flow path constituted by the primary-side flow path 2, the ion removing apparatus 3, the separating apparatus 4, and the return flow path 12. Even with this configuration, the solubilizer can be supplied to the separating apparatus 4 to dissolve the crystals adhering to the separating apparatus 4 for performing the regeneration treatment.

In the above description, only the fine bubbles containing the ion removal gas are supplied to the hard water; however, the present disclosure is not limited thereto. For example, another gas may be supplied in addition to the fine bubbles containing the ion removal gas into hard water. In this case, the other gas may be supplied as fine bubbles into the hard water or may be supplied as ordinary bubbles into the hard water.

In the above description, the opening/closing operations of the first valve 15A, the second valve 15B, and the third valve 15C are automatically controlled by the controller 6; however, the present disclosure is not limited thereto. The opening/closing operations of the first valve 15A, the second valve 15B, and the third valve 15C may manually be performed.

In the case described above, the fine bubbles used are obtained by mixing the two types of gases, i.e., the first gas that is a basic gas and the second gas that is a gas having a property of slower dissolution rate than the first gas; however, another gas may be mixed in addition to these two types of gas. Therefore, the fine bubbles of a mixed gas obtained by mixing two or more types of gases including the first gas and the second gas may be used.

It is noted that any of the various embodiments and modifications described above can appropriately be combined to produce the effects of the respective embodiments.

Although the present disclosure has been sufficiently described in terms of preferable embodiments with reference to the accompanying drawings, various modifications and corrections are apparent to those skilled in the art. It should be understood that such modifications and corrections are included in the present disclosure without departing from the scope of the present disclosure according to the accompanying claims. Changes in combinations and orders of elements in the embodiments may be achieved without departing from the scope and the idea of the present disclosure.

INDUSTRIAL APPLICABILITY

The ion removing system according to the present disclosure is excellent in maintainability and environmental properties and is therefore useful for both a household ion removing system and an industrial ion removing system.

REFERENCE SIGNS LIST 1 ion removing system
2 primary-side flow path
3 ion removing apparatus
3A hard water storage part
3B fine bubble generating part
3C connection flow path
4 separating apparatus
4A separating part
4Aa inner circumferential surface
4B crystal storage part
4Ba discharge flow path
5 secondary-side flow path
6 controller
7 ion removal gas supply part
8 solubilizer supply part
9 gas switching mechanism
10 opening/closing valve
11 discharge-side backflow prevention mechanism
12 return flow paths
13 supply-side backflow prevention mechanism
14 bypass flow paths
15A first valve
15B second valve
15C third valve
20 apparatus
21 hard water
22 water tank
22$a$ bottom surface
22$b$ water surface
24 gas supply part
25 first piping
26 fine bubble generating part
27 second piping
28 pump
30 first water intake part
32 second water intake part
34 metal ion concentration detector
40 fine bubble
42 crystal
D1 distance from first water intake part to second water intake part
50 apparatus
52 mixed gas supply part
54 treatment tank
56 first piping
58 second piping
60 water sampling valve
62 water sampler
64 water storage tank
66 pump
68 flow rate adjustment valve
70 flowmeter
72 ammonia supply source
74 nitrogen supply source
76 mixing ratio adjustment valve
78 supply piping
80 fine bubble generating part
82 treated water
84 crystal

The invention claimed is:

1. An ion removing system comprising:
an ion removing apparatus that comprises a hard water storage part for storing hard water and a fine bubble generator for generating and supplying fine bubbles provided by an ion removal gas, each bubble having a diameter of 100 μm or less, in a proportion of 90% or more to the hard water storage part and wherein the ion removing apparatus causes the fine bubbles to adsorb and thereby remove a plurality of metal ions in the hard water,
a primary-side flow path connected to the ion removing apparatus to supply the hard water to the ion removing apparatus,
a separating apparatus including a separating part having an inner circumferential surface and a crystal storage part, the separating part connected to the ion removing apparatus by a connection flow path disposed on an upper outer circumferential portion of the hard water storage part, the separating part for separating at least some of a plurality of crystals of a metal component deposited by crystallizing at least some of the plurality of metal ions removed from the hard water by the ion removing apparatus, wherein:
the connection flow path is connected to the separating part such that the hard water having passed through the ion removing apparatus is discharged in an eccentric arrangement relative to a central axis of the separating apparatus, and
the crystal storage part is disposed below the separating part, the crystal storage part including a discharge flow path for discharging the hard water containing the plurality of crystals of the metal component, the discharge flow path provided with an opening/closing valve capable of opening and closing the discharge flow path, and
a discharge-side backflow prevention mechanism is disposed on the discharge flow path downstream of the opening/closing valve in a discharge direction and is configured to prevent backflow by a spout space disposed at an outlet of the discharge flow path, and
a secondary-side flow path connected to the separating apparatus to take out, from the separating apparatus, treated water obtained by separating the plurality of crystals, a return flow path connected to the separating apparatus and the primary-side flow path to return a portion of the treated water to the primary-side flow path, wherein
the primary-side flow path is provided with at least a supply-side check valve.

2. The ion removing system according to claim 1, wherein the supply-side check valve is disposed on the primary-side flow path upstream of the return flow path in a flow direction of the hard water.

3. The ion removing system according to claim 1, further comprising
a bypass flow path connecting the primary-side flow path and the secondary-side flow path, and
a flow switching valve switching a flow direction of the hard water flowing through the primary-side flow path to either the ion removing apparatus or the bypass flow path, wherein
the supply-side check valve is disposed on the primary-side flow path upstream of the bypass flow path in the flow direction of the hard water flowing through the primary-side flow path to the bypass flow path.

4. The ion removing system according to claim 1, wherein the discharge flow path may be provided with at least a discharge-side check valve.

5. The ion removing system according to claim 1, further comprising a bypass flow path connecting the primary-side flow path and the secondary-side flow path, and
a flow switching valve switching a flow direction of the hard water flowing through the primary-side flow path to either the ion removing apparatus or the bypass flow path.

6. The ion removing system according to claim 5, wherein
the flow switching valve comprises a first valve capable of opening and closing the primary-side flow path, a second valve capable of opening and closing the secondary-side flow path, and a third valve capable of opening and closing the bypass flow path.

7. The ion removing system according to claim 6, further comprising a controller controlling opening and closing operations of the first valve, the second valve, and the third valve, wherein
the controller is configured to selectively provide a first control of opening the first valve and the second valve and closing the third valve, and a second control of closing the first valve and the second valve and opening the third valve.

8. The ion removing system according to claim 1, further comprising a pump causing the hard water flowing through the primary-side flow path to flow through the ion removing apparatus to the separating apparatus.

9. The ion removing system according to claim 1, wherein a circulation flow path that is a closed system, is constituted by the primary-side flow path, the ion removing apparatus, the separating apparatus, and the return flow path.

10. The ion removing system according to claim 1, wherein the ion removing apparatus comprises a connection flow path connected to the separating apparatus below an end portion of the return flow path.

11. The ion removing system according to claim 1, further comprising a solubilizer supply tank supplying a solubilizer for dissolving the plurality of crystals deposited by crystallizing the plurality of metal ions to an upstream side in a flow direction of the hard water relative to the separating apparatus.

12. The ion removing system according to claim 11, further comprising a pump causing the hard water flowing through the primary-side flow path to flow through the ion removing apparatus to the separating apparatus, wherein
the fine bubble generator is disposed downstream of the pump in a flow direction of the hard water.

13. The ion removing system according to claim 11, wherein
a circulation flow path is constituted by the primary-side flow path, the ion removing apparatus, the separating apparatus, and the return flow path; and
the solubilizer supply tank is disposed to supply the solubilizer into the circulation flow path.

* * * * *